US011369880B2

(12) United States Patent
Aghdaie et al.

(10) Patent No.: US 11,369,880 B2
(45) Date of Patent: *Jun. 28, 2022

(54) DYNAMIC DIFFICULTY ADJUSTMENT

(71) Applicant: Electronic Arts Inc., Redwood City, CA (US)

(72) Inventors: Navid Aghdaie, San Jose, CA (US);
John Kolen, Foster City, CA (US);
Mohamed Marwan Mattar, San Francisco, CA (US); Mohsen Sardari, Redwood City, CA (US); Su Xue, Fremont, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,040

(22) Filed: Oct. 6, 2020

(65) Prior Publication Data

US 2021/0086083 A1 Mar. 25, 2021

Related U.S. Application Data

(63) Continuation of application No. 16/401,389, filed on May 2, 2019, now Pat. No. 10,807,004, which is a
(Continued)

(51) Int. Cl.
*A63F 13/67* (2014.01)
*G06N 7/00* (2006.01)
(Continued)

(52) U.S. Cl.
CPC .............. *A63F 13/67* (2014.09); *A63F 13/35* (2014.09); *G06N 7/005* (2013.01); *G06Q 10/04* (2013.01);
(Continued)

(58) Field of Classification Search
None
See application file for complete search history.

(56) References Cited

U.S. PATENT DOCUMENTS 5,274,801 A 12/1993 Gordon
5,683,082 A 11/1997 Takemoto et al.
(Continued)

FOREIGN PATENT DOCUMENTS

CN 104657412 A 5/2015
KR 10-2009-0092007 A 8/2009
(Continued)

OTHER PUBLICATIONS

Aponte et al., "Measuring the level of difficulty in single player video games," Elsevier, Entertainment Computing (2011) 205-213.
(Continued)

*Primary Examiner* — Kevin Y Kim
(74) *Attorney, Agent, or Firm* — Knobbe, Martens, Olson & Bear, LLP

(57) ABSTRACT

Embodiments of systems presented herein may perform automatic granular difficulty adjustment. In some embodiments, the difficulty adjustment is undetectable by a user. Further, embodiments of systems disclosed herein can review historical user activity data with respect to one or more video games to generate a game retention prediction model that predicts an indication of an expected duration of game play. The game retention prediction model may be applied to a user's activity data to determine an indication of the user's expected duration of game play. Based on the determined expected duration of game play, the difficulty level of the video game may be automatically adjusted.

20 Claims, 11 Drawing Sheets

Related U.S. Application Data continuation of application No. 15/896,608, filed on Feb. 14, 2018, now Pat. No. 10,286,323, which is a continuation of application No. 15/064,082, filed on Mar. 8, 2016, now Pat. No. 9,919,217.

(51) Int. Cl.
| | | |
|---|---|---|
| *G06Q 30/02* | | (2012.01) |
| *A63F 13/35* | | (2014.01) |
| *G06Q 10/04* | | (2012.01) |
| *G06N 20/00* | | (2019.01) |

(52) U.S. Cl.
CPC ........ *G06Q 30/02* (2013.01); *A63F 2300/535* (2013.01); *G06N 20/00* (2019.01)

(56) References Cited

U.S. PATENT DOCUMENTS

| | | | |
|---|---|---|---|
| 6,106,395 A | 8/2000 | Begis | |
| 6,253,193 B1 | 6/2001 | Ginter et al. | |
| 6,285,380 B1 | 9/2001 | Perlin | |
| 7,390,254 B2 | 6/2008 | Hirai | |
| 7,636,701 B2 | 12/2009 | Funge et al. | |
| 8,100,770 B2 | 1/2012 | Yamazaki et al. | |
| 8,142,282 B2 | 3/2012 | Canessa et al. | |
| 8,267,764 B1 | 9/2012 | Aoki et al. | |
| 8,398,476 B1 | 3/2013 | Sidhu et al. | |
| 8,540,560 B2 | 9/2013 | Crowley et al. | |
| 8,821,290 B2 | 9/2014 | Fujisawa et al. | |
| 8,907,193 B2 | 12/2014 | Cross et al. | |
| 8,914,251 B2 | 12/2014 | Ohta | |
| 9,001,118 B2 | 4/2015 | Molyneaux et al. | |
| 9,013,489 B2 | 4/2015 | Evertt et al. | |
| 9,033,796 B2 | 5/2015 | Fujisawa et al. | |
| 9,069,441 B2 | 6/2015 | Jacob | |
| 9,616,329 B2 | 4/2017 | Szufnara et al. | |
| 9,919,217 B2 | 3/2018 | Aghdaie et al. | |
| 10,004,984 B2 | 6/2018 | Voris et al. | |
| 10,105,603 B2 | 10/2018 | Bucher | |
| 10,286,323 B2 | 5/2019 | Aghdaie et al. | |
| 10,357,718 B2 | 7/2019 | Aghdaie et al. | |
| 10,478,730 B1 | 11/2019 | Burnett | |
| 10,569,176 B2 | 2/2020 | D'angelo et al. | |
| 10,713,543 B1 | 7/2020 | Skuin et al. | |
| 10,799,798 B2 | 10/2020 | Aghdaie et al. | |
| 10,807,004 B2 | 10/2020 | Aghdaie et al. | |
| 10,839,215 B2 | 11/2020 | Somers et al. | |
| 10,940,393 B2 | 3/2021 | Somers et al. | |
| 10,953,334 B2 | 3/2021 | Kolen et al. | |
| 2004/0067788 A1 | 4/2004 | Angelopoulos | |
| 2004/0152512 A1 | 8/2004 | Collodi et al. | |
| 2005/0130725 A1 | 6/2005 | Creamer et al. | |
| 2007/0054717 A1 | 3/2007 | Youm et al. | |
| 2007/0060364 A1 | 3/2007 | Osgood et al. | |
| 2007/0066403 A1 | 3/2007 | Conkwright | |
| 2007/0260567 A1 | 11/2007 | Funge et al. | |
| 2008/0097948 A1 | 4/2008 | Funge et al. | |
| 2008/0266250 A1 | 10/2008 | Jacob | |
| 2008/0268961 A1 | 10/2008 | Brook | |
| 2009/0202114 A1 | 8/2009 | Morin et al. | |
| 2009/0307671 A1 | 12/2009 | White et al. | |
| 2010/0144444 A1 | 6/2010 | Graham | |
| 2010/0302257 A1 | 12/2010 | Perez et al. | |
| 2011/0007079 A1 | 1/2011 | Perez et al. | |
| 2011/0035280 A1* | 2/2011 | Fordyce, III ........... | G06Q 30/02 705/14.53 |
| 2011/0295649 A1 | 12/2011 | Fine et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0233105 A1 | 9/2012 | Cavallaro et al. | |
| 2012/0244941 A1 | 9/2012 | Ostergren et al. | |
| 2012/0276964 A1 | 11/2012 | Jones et al. | |
| 2012/0309520 A1 | 12/2012 | Evertt et al. | |
| 2013/0178281 A1 | 7/2013 | Ayyar et al. | |
| 2013/0316779 A1 | 11/2013 | Vogel | |
| 2013/0316795 A1 | 11/2013 | Vogel | |
| 2013/0342527 A1 | 12/2013 | Molyneaux et al. | |
| 2014/0235346 A1 | 8/2014 | Kim et al. | |
| 2014/0249961 A1 | 9/2014 | Zagel et al. | |
| 2014/0274370 A1 | 9/2014 | Shah | |
| 2015/0105161 A1 | 4/2015 | Sumaki et al. | |
| 2015/0213646 A1 | 7/2015 | Ma et al. | |
| 2015/0302505 A1 | 10/2015 | Di et al. | |
| 2015/0339532 A1 | 11/2015 | Sharma et al. | |
| 2016/0005270 A1 | 1/2016 | Marr et al. | |
| 2016/0067612 A1 | 3/2016 | Ntoulas et al. | |
| 2017/0259177 A1 | 9/2017 | Aghdaie et al. | |
| 2017/0312634 A1 | 11/2017 | Ledoux et al. | |
| 2017/0365102 A1 | 12/2017 | Huston et al. | |
| 2018/0001216 A1 | 1/2018 | Bruzzo et al. | |
| 2018/0161673 A1 | 6/2018 | Pasternack et al. | |
| 2018/0161682 A1 | 6/2018 | Myhill | |
| 2018/0169526 A1 | 6/2018 | Aghdaie et al. | |
| 2018/0243656 A1 | 8/2018 | Aghdaie et al. | |
| 2019/0087965 A1 | 3/2019 | Datta | |
| 2019/0184286 A1 | 6/2019 | Du et al. | |
| 2019/0197402 A1 | 6/2019 | Kovacs et al. | |
| 2019/0294881 A1 | 9/2019 | Polak et al. | |
| 2019/0354759 A1 | 11/2019 | Somers et al. | |
| 2019/0381407 A1 | 12/2019 | Aghdaie et al. | |
| 2019/0388789 A1 | 12/2019 | Aghdaie et al. | |
| 2020/0078685 A1 | 3/2020 | Aghdaie et al. | |
| 2020/0193671 A1 | 6/2020 | Tamir | |
| 2020/0306640 A1 | 10/2020 | Kolen et al. | |
| 2020/0342677 A1 | 10/2020 | Molyneaux et al. | |
| 2021/0001229 A1 | 1/2021 | Somers et al. | |
| 2021/0008456 A1 | 1/2021 | Somers et al. | |
| 2021/0027119 A1 | 1/2021 | Skuin et al. | |
| 2021/0093974 A1 | 4/2021 | Aghdaie et al. | |

FOREIGN PATENT DOCUMENTS

| | | |
|---|---|---|
| KR | 10-2012-0052228 | 5/2012 |
| KR | 10-2013-0118433 A | 10/2013 |
| KR | 10-2014-0033088 | 3/2014 |
| KR | 10-1603681 B1 | 3/2016 |
| KR | 10-2016-0115959 | 10/2016 |
| KR | 10-2016-0145732 | 12/2016 |

OTHER PUBLICATIONS

Aristidou et al., "Inverse Kinematics Techniques in Computer Graphics: A Survey," Comp Graphics Forum, vol. 00:1-24 (2017).

Bengio, et al., Curriculum Learning, Proceedings of the 26th International Conference on Machine Learning, 2009, in 8 pages.

Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.

Chen et al., ""Visualization System for Animating Vertebrate Animal Models"", 2012, IEEE, 2012 Conference on Technologies and Applications of Artificial Intelligence, pp. 244-249.

Chou et al., "Self Adversarial Training for Human Pose Estimation", Nov. 15, 2018, APSI PA, Proceedings, APSI PA Annual Summit and Conference 2018, pp. 17-30.

Davis et al., "A Sketching Interface for Articulated Figure Animation," Eurographics—SIGGRAPH Symp on Comp Animation (2003).

Donges, Niklas, Transfer Learning—Towards Data Science, Apr. 23, 2018, https://towardsdatascience.com/transfer-learning-946518f95666.

Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.

Ho, et al., Generative Adversarial Imitation Learning, pp. 1-14, arXiv:1606.03476v1 [cs.LG]; Jun. 10, 2016.

Isola et al., "Image-to-Image Translation with Conditional Adversarial Networks," BAIR Lab, UC Berkeley (Nov. 26, 2018).

(56) References Cited

OTHER PUBLICATIONS

Kanazawa et al., "Learning Category-Specific Mesh Reconstruction from Image Collections", 2018, The European Conference on Computer Vision (ECCV), pp. 371-386.

Mehta et al., "Vnect: Real-time 3D Human Pose Estimation with a Single RGB Camera," ACM Transactions on Graphics, vol. 36:4 (Jul. 2017).

Pittman, "The Pac-Man Dossier," Gamasutra, downloaded on Jun. 1, 2018, available at <<https://web.archive.org/web/20161107115846/https://www.gamasutra.com/view/feature/3938/the_pacman_dossier.php?print=1>>.

Pruett, "Defining the All-Important Difficulty Curve," J of Ed, Comm & Value, vol. 8:1, Jan.-Feb. 2008, http ://com mons.pacificu.edu/cg i/viewcontent.cg i?article= 1 002&context=inter08.

Shih et al., "Video-based Motion Capturing for Skelton-based 3D Models," National Taiwan University.

Shorten, "Image-to-lmage Translation with Conditional Adversarial Networks," Pix2Pix, https://towardsdatascience.com/pix2pix.869c17900998?gi=e4c177e8a7c7 (Jan. 29, 2019).

Van de Panne, "Control for Simulated Human and Animal Motion," Dept Comp Sci, University of Toronto (1998).

Zweng et al., "Unexpected Human Behavior Recognition in Image Sequences using Multiple Features", Aug. 26, 2010, IEEE, 2010 20th International Conference on Pattern Recognition, pp. 368-371.

\* cited by examiner

DYNAMIC DIFFICULTY ADJUSTMENT

RELATED APPLICATIONS

This application is a continuation of U.S. application Ser. No. 16/401,389, which was filed May 2, 2019 and is titled "DYNAMIC DIFFICULTY ADJUSTMENT," the disclosure of which is hereby incorporated by reference herein in its entirety for all purposes, and which is a continuation of U.S. application Ser. No. 15/896,608, which was filed Feb. 14, 2018 and is titled "DYNAMIC DIFFICULTY ADJUSTMENT," the disclosure of which is hereby incorporated by reference herein in its entirety for all purposes, and which is a continuation of U.S. application Ser. No. 15/064,082, which was filed Mar. 8, 2016 and is titled "DYNAMIC DIFFICULTY ADJUSTMENT," the disclosure of which is hereby incorporated by reference herein in its entirety for all purposes. Any and all priority claims identified in the Application Data Sheet, or any correction thereto, are hereby incorporated by reference under 37 CFR 1.57.

BACKGROUND

Software developers typically desire for their software to engage users for as long as possible. The longer a user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game.

Often, games that are too difficult or too easy will result in less enjoyment for a user. Consequently, the user is likely to play the game less. Thus, one of the challenges of game development is to design a game with a difficulty level that is most likely to keep a user engaged for a longer period of time.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments, a computer-implemented method is disclosed that may be implemented by an interactive computing system configured with specific computer-executable instructions to at least determine a user identifier of a user who is playing a video game on a user computing device. Further, the method may include accessing a set of input data associated with the user based at least in part on the user identifier of the user. The set of input data may comprise user interaction data associated with the user's interaction with the video game. In addition, based at least in part on the set of input data, the method may include determining a predicted churn rate for the user. The predicted churn rate may correspond to a probability that the user ceases to play the video game. Further, based at least in part on the predicted churn rate for the user, the method may include selecting a seed value for a knob associated with the video game. The knob may include a variable that when adjusted causes a modification to a state of the video game. Moreover, the method may include modifying execution of the video game by adjusting the knob based at least in part on the seed value.

In some implementations, modifying the execution of the video game comprises adjusting a difficulty of the video game. Further, the user interaction data may include recent user interaction data that is more recent than a threshold age time period and historical user interaction data that less recent than a threshold age time period. In some cases, the recent user interaction data is weighted more heavily than the historical user interaction data. Further, in some cases, the threshold age time period corresponds to a number of play sessions of the video game by the user.

For some embodiments, determining the predicted churn rate comprises providing the set of input data to a parameter function. The parameter function may be generated based at least in part on a machine learning algorithm. Further, the method may include determining the predicted churn rate based at least in part on an output of the parameter function. Moreover, generating the parameter function may include at least accessing a second set of input data. The second set of input data may be associated with a plurality of users who play the video game and may include data indicating churn rates for past game play for the plurality of users. In addition, the method may include using the machine learning algorithm to determine the parameter function based at least in part on the set of input data. Moreover, the method may include associating a penalty with the parameter function based at least in part on one or more of the following: a number of variables included in the parameter function, a complexity of a mathematical algorithm associated with the parameter function, or an accuracy of an output of the parameter function compared to the output data. Additionally, the method may include selecting the parameter function from a plurality of parameter functions based at least in part on a penalty value associated with at least some of the parameter functions from the plurality of parameter functions.

In some implementations, based at least in part on the set of input data, the method includes determining a reason for the predicted churn rate. In addition, based at least in part on the reason for the predicted churn rate, the method may include selecting the seed value for the knob associated with the video game. Further, modifying the execution of the video game may include providing the seed value to the user computing device.

In certain embodiments, a system comprising an electronic data store configured to store user interaction data with respect to a video game is disclosed. The system may further include a hardware processor in communication with the electronic data store. The hardware processor may be configured to execute specific computer-executable instructions to at least determine a user identifier of a user who is playing a video game and access a set of input data associated with the user based at least in part on the user identifier of the user. The set of input data may comprise user interaction data associated with the user's interaction with the video game. Further, based at least in part on the set of input data, the system can determine a retention probability associated with the probability that the user ceases to play the video game. Moreover, based at least in part on the retention probability for the user, the system can identify an adjustment value to a variable in the video game. The variable may be associated with a level of difficulty of the video game. In addition, the system may modify execution of the video game based at least in part on the adjustment value.

With some implementations, the modified execution of the video game is undetectable by the user. Moreover, in some cases, at least the accessing the set of input data, the determining the retention probability, the identifying the adjustment value, and the modifying the execution of the video game is repeated in response to a trigger event occurring during a play session of the video game by the user.

In addition, determining the retention probability may include providing the set of input data to a prediction model. The prediction model may be generated by a machine learning system. Further, the system can determine the retention probability based at least in part on an output of the prediction model. Moreover, in some cases, the hardware processor is further configured to generate the prediction model by executing specific computer-executable instructions to at least access a second set of input data. The second set of input data may be associated with a plurality of users who play the video game and may include data associated with a retention rate for the plurality of users. Further, the system may use the machine learning system to determine the prediction model based at least in part on the set of input data and the retention rate. In some cases, at least some prediction models from a plurality of prediction models are associated with a penalty. At least one prediction model from the plurality of prediction models may be associated with a different penalty than at least one other prediction model, and the hardware processor may be further configured to execute specific computer-executable instructions to at least select the prediction model from the plurality of prediction models based at least in part on the penalty associated with the plurality of prediction models.

Certain embodiments disclosed herein relate to a non-transitory computer-readable storage medium storing computer executable instructions that, when executed by one or more computing devices, configure the one or more computing devices to perform operations comprising accessing a set of input data associated with a user. The set of input data may include user interaction data associated with the user's interaction with the video game. Further, based at least in part on the set of input data, the operations may include determining a retention probability associated with the probability that the user ceases to play the video game. Moreover, based at least in part on the retention probability for the user, the operations may include identifying a difficulty level for the video game. In addition, based at least in part on the difficulty level for the video game, the operations may include identifying one or more seed values associated with the difficulty level.

In certain embodiments, the operations further comprise modifying the difficulty level of the video game by selecting a seed value from the one or more seed values to use during execution of the video game. Moreover, the operations may further comprise determining the retention probability by at least providing the set of input data to a prediction model. The prediction model may be generated by a machine learning system. Furthermore, the operations may include determining the retention probability based at least in part on an output of the prediction model.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1A:
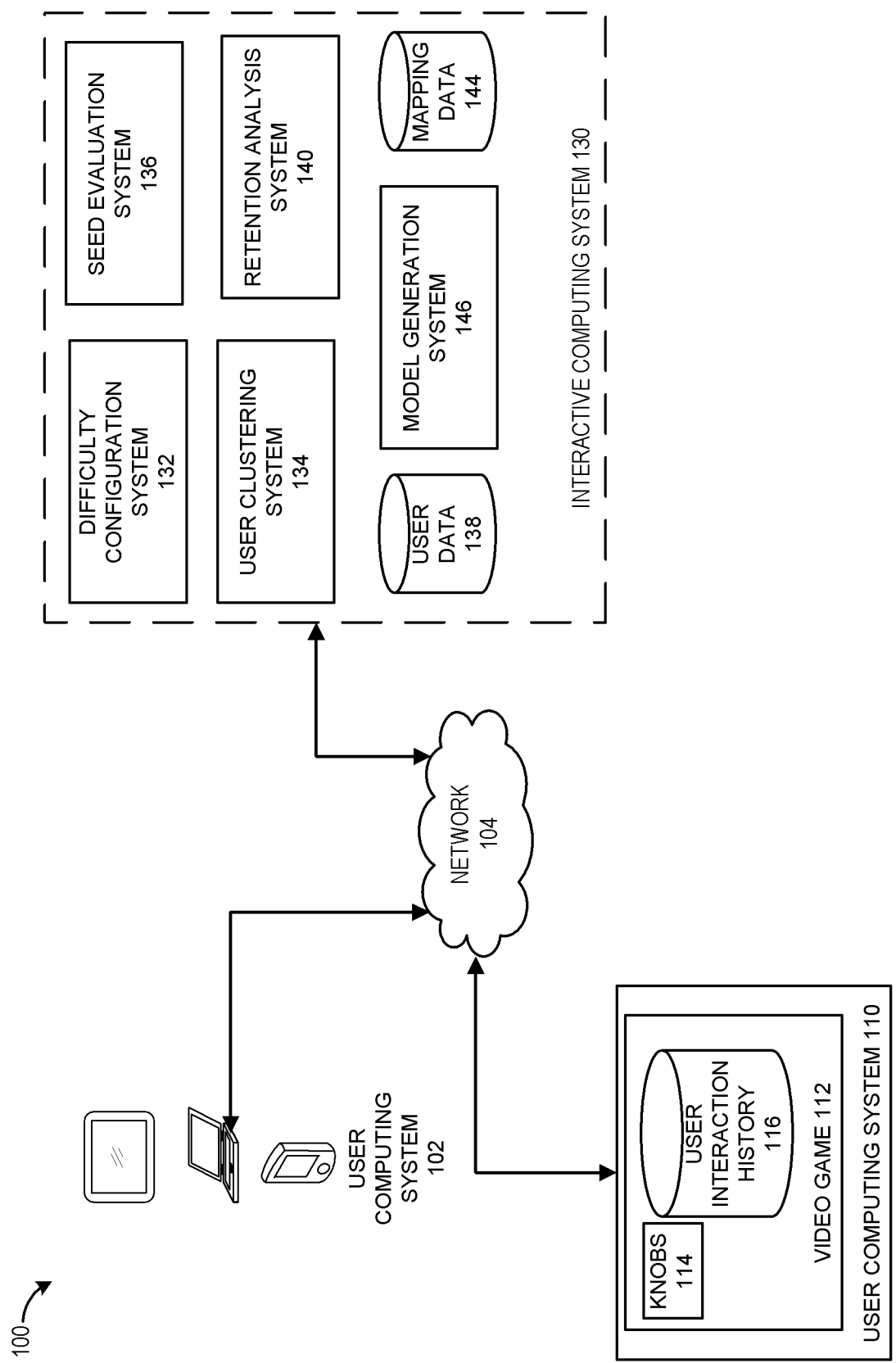
FIG. 1A illustrates an embodiment of a networked computing environment that can implement one or more embodiments of a dynamic difficulty adjustment system.

It is generally desirable for a video game to appeal to a large number of users. However, different users have different levels of skill and/or abilities when it comes to playing video games or video games of a particular genre or type. Further, different users have different desires with respect to how challenging a video game is to play. For example, some users prefer video games that are relatively challenging. These types of users may tend to be more engaged by a video game that may require a lot of practice to master and typically may not mind repeating the same portion of the video game numerous times before being successful. In contrast, some users prefer video games that are relatively easy. These types of users may tend to be more engaged by a video game where obstacles are easily overcome and the users rarely are required to repeat a portion of the video game to be successful.

One solution to the above challenges is for video game developers to incorporate multiple static difficulty levels within a particular video game. However, there are generally a limited number of difficulty levels that a developer can add due, for example, to storage constraints, development time constraints, and the challenge of predicting a large number of difficulty levels for a large number of user preferences. Further, these difficulty levels are generally coarse because, for example, the difficulty levels are typically created by adjusting a defined set of adjustable elements (which may sometimes be referred to as "knobs" herein). Thus, because a particular user may find a particular aspect of a video game challenging, but another aspect of the video game not challenging, selecting a static difficulty level may result in an inconsistent challenge throughout the video game for the particular user. Moreover, this problem of static difficulty levels is exacerbated by the fact that another user may find different aspects of the video game challenging or easy.

Another solution that may be used in some types of competitive video games, such as racing games, is to vary the ability of the user or the user's competitor based on the relationship between the user and the user's competitor. For example, supposing that the video game is a racing game, the user's car may be made faster when the user is doing poorly and may be made slower when the user is doing well. This solution may result in what is sometimes referred to as a "rubber band effect." This solution is often noticeable by the user because the user's vehicle will behave inconsistently based on the location of the vehicle with respect to the user's competitor. As a result, instead of appealing to a user, the user may be driven away. Further, this solution can be challenging to implement with some types of video games that do not measure a user against a specific competitor.

Embodiments presented herein include a system and method for performing dynamic difficulty adjustment. Further, embodiments disclosed herein perform dynamic difficulty adjustment using processes that are not detectable or are more difficult to detect by users compared to static and/or existing difficulty adjustment processes. In some embodiments, historical user information is fed into a machine learning system to generate a prediction model that predicts an expected duration of game play, such as for example, an expected churn rate, a retention rate, the length of time a user is expected to play the game, or an indication of the user's expected game play time relative to a historical set of users who have previously played the game. Before or during game play, the prediction model is applied to information about the user to predict the user's expected duration of game play. Based on the expected duration, the system may then utilize a mapping data repository to determine how to dynamically adjust the difficulty of the game, such as, for example, changing the values of one or more knobs to make portions of the game less difficult.

In certain embodiments, systems disclosed herein monitor user activity with respect to one or more video games to determine a user's preferences regarding game difficulty and the user's skill level with respect to playing the video games. This information may be determined based at least in part on factors that are associated with a user's engagement level. For example, a user who plays a video game for an above average length of time and who spends money while playing the video game may have a higher level of engagement than a user who plays a video game for a short period of time. As another example, a user who plays a video game for a short period of time, but who plays an above average number of play sessions may be associated with a high level of engagement, but may be classified differently than the user of the previous example.

Further, in certain embodiments described herein, users may be grouped with other users who have similar preferences into clusters. The users may be grouped based on user behavior with respect to challenges or obstacles presented in the video game. Each of the groups or clusters of users may be associated with difficulty preferences or settings for one or more video games. Using this information, one or more aspects of the video game can be dynamically adjusted to present a user of the video game with a particular difficulty level that is most likely to engage the user, or more likely to engage the user than a static set of difficulty levels. As noted above and further herein, additional or alternative embodiments described herein may determine one or more seeds or knob values for adjusting the difficulty of the video game by using one or more parameter functions or prediction models. In some cases, the prediction models may be combined with clustering. In other embodiments, the prediction models may be used instead of clustering. It should be understood that clustering is one method that may be used with embodiments of the present disclosure. However, the present disclosure is not limited to the use of clustering and certain embodiments presented herein may omit the user of clustering. For example, certain embodiments disclosed herein may use a regression model to fit historical user data without the use of clustering. After obtaining an initial version of the regression model, it can be applied to additional players to facilitate the dynamic difficulty analysis and/or adjustment.

Moreover, in certain embodiments described herein, the user's activity with respect to the video game can be monitored or reviewed to determine the user's behavior with respect to the video game. This monitoring may occur substantially in real-time, or at some period of time after the user has completed a play session. The play session may be a period of time when the user plays the video game and/or a particular attempt to play the game that ends with the user completing or failing to complete the video game or a portion thereof. For example, one play session may begin with the user initiating a new instance of game play and end with the user running out of lives in the game. As another example, one play session may begin with the user initiating the video game and ending when the user exist the video game.

In some cases, monitoring the user's behavior with respect to the video game may enable a determination of the user's skill level and desired level of challenge. Based at least in part on this information, the difficulty of the video game, or portions of the video game, can be adjusted from the initial difficulty level determined based on the associated user cluster for the user.

Advantageously, in certain embodiments, by grouping users with similar characteristics with respect to playing video games and by adjusting difficulty levels based on individual user actions with respect to the video games, a more fine-grained management of difficulty level is possible compared to systems that do not monitor user behavior to determine a difficulty level. Further, although this disclosure focuses on adjusting settings of a video game that modify the difficulty level or challenge presented by the video game, this disclosure is not limited as such. Embodiments of the present disclosure can be used to modify various aspects of game state of a video game, which may or may not affect the difficulty level of the video game. For example, in a game where weapons are randomly dropped, if it is determined that a user prefers to play a game using a particular in-game weapon, the game may be adjusted to present the preferred weapon to the user more frequently. In some cases, such as when all weapons are evenly balanced, the type of weapon dropped may not impact the difficulty of the video game and thus, such an adjustment may be based on user play styles or preferences rather than difficulty level preferences. Some other non-limiting examples of features of the video game that can be modified, which may or may not be detectable by the user can include providing extra speed to an in-game character, improving throwing accuracy of an in-game character, improving the distance or height that the in-game character can jump, adjusting the responsiveness of controls, and the like. In some cases, the adjustments may additionally or alternatively include reducing the ability of an in-game character rather than improving the ability of the in-game character. For example, the in-game character may be made faster, but have less shooting accuracy.

Further, embodiments of the systems presented herein can adjust the difficulty level of the video game substantially in real time based at least in part on the user's skill level and whether the user is successfully completing challenges within the video game. However, the present disclosure is not limited as such. For example, the difficulty level of the video game may be adjusted based at least in part on user preferences, which may or may not correspond to a user's ability. For example, some users may prefer to play video games at the most difficult settings regardless of whether they are successful at completing the video game or objectives therein. By monitoring user actions with respect to playing a video game, the difficulty level of the video game can be adjusted to match a particular user's preferences and/or skill level.

To simplify discussion, the present disclosure is primarily described with respect to a video game. However, the present disclosure is not limited as such may be applied to other types of applications. For example, embodiments disclosed herein may be applied to educational applications or other applications that may be modified based on a history of user interactivity with the application. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Example Networked Computing Environment

FIG. 1A illustrates an embodiment of a networked computing environment 100 that can implement one or more embodiments of a dynamic difficulty adjustment system. The networked computing environment 100 includes a user computing system 110 that can communicate with an interactive computing system 130 via a network 104. Further, the networked computing environment 100 may include a number of additional user computing systems 102. At least some of the user computing systems 102 may be configured the same as or similarly to the user computing system 110.

User computing system 110 may include or host a video game 112. In some cases, the video game 112 may execute entirely on the user computing system 110. In other cases, the video game 112 may execute at least partially on the user computing system 110 and at least partially on the interactive computing system 130. In some cases, the video game 112 may execute entirely on the interactive computing system 130, but a user may interact with the video game 112 via the user computing system 110. For example, the game may be a massively multiplayer online role-playing game (MMORPG) that includes a client portion executed by the user computing system 110 and a server portion executed by one or more application host systems (not shown) that may be included as part of the interactive computing system 130. As another example, the video game 112 may be an adventure game played on the user computing system 110 without interacting with the interactive computing system 130.

The video game 112 may include a number of knobs 114 that modify or affect the state of the video game 112. Typically, the knobs 114 are variables that affect the execution or operation of the video game 112. In some cases, the knobs 114 are state variables that directly modify the execution of the video game 112. In other cases, the knobs 114 are seeds or seed variables that may alter the probability of an occurrence within the video game 112 or a random (or pseudorandom) configuration or event within the video game 112. For example, one seed may correspond to and impact the generation of a level layout in the video game 112. As another example, one seed may correspond to and impact the number of occurrences of item drops or the types of items dropped as a user plays the video game 112. In some cases, the seed value is a value that initializes or influences a random or pseudorandom number generator. In some such cases, the random number generated based on the seed value may be utilized by one or more functions of the video game 112 to influence the operation of the video game 112. In some cases, the seed variables may be referred to as levers, and the seed variables are non-limiting examples of various types of knobs. It should be understood that the knobs 114, sometimes referred to as levers, are not limited to seeds, but can include any type of variable that may modify execution of the video game 112. The system may modify execution of the video game by adjusting any type of knob or lever that can change the video game 112 and may conduct a knob-level analysis of the churn rate. The system is not limited to adjusting the knob or lever based on a seed value.

Generally, the knobs 114 are variables that relate to a difficulty level of the video game 112. It should be understood that the knobs 114 typically include a subset of variables that modify the operation of video game 112 and that the video game 112 may include other variables not involved in the setting of the difficulty level of video game 112 and/or not available for modification. Further, the knobs 114 may include variables that modify the video game 112 in a manner that is not perceivable by a user or is difficult to perceive by the user. In some cases, whether or not the modification to the video game 112 is perceivable by the user may depend on the specific video game. For example, suppose that one knob 114 relates to the amount of life that an enemy in the video game 112 has. In some cases, modifying the value assigned to the knob 114 may be detectable by a user because, for example, the health of the enemy is numerically presented to the user. In such cases, the health of the enemy may remain unmodified in the difficulty level of video game 112, but the difficulty level of the video game 112 may be modified via a different knob 114. However, in some cases, modifying the health of the enemy may not be detectable by the user because, for example, the health of the enemy is not presented to the user and the amount of hits required to defeat the enemy varies within a range making it difficult for the user to determine that the health of the enemy may have been modified from one encounter with the enemy compared to another encounter with the enemy (for example, from one play through of the video game 112 compared to another play through of the video game 112).

In some cases, the video game 112 may include a user interaction history repository 116. The user interaction history repository 116 may store data or information relating to the user's interaction with the video game 112. This user interaction information or data may include any type of information that can be used to determine a user's level of engagement with the video game 112 and/or how difficult the video game 112 is for the user. For example, some non-limiting examples of the user interaction information may include information relating to actions taken by the user within the video game 112; a measure of the user's progress within the video game 112; whether the user was successful at performing specific actions within the video game 112 or completing particular objectives within the video game 112; how long it took the user to complete the particular objectives; how many attempts it took the user to complete the particular objectives; how much money the user spent with respect to the video game 112, which may include one or both of the amount of money spent to obtain access to the video game 112 and the amount of money spent with respect to the video game 112 exclusive of money spent to obtain access to the video game 112; how frequently the user accesses the video game 112; how long the user plays the video game 112; and the like. The user computing system 110 may share the user interaction information with the interactive computing system 130 via the network 104. In some embodiments, some or all of the user interaction information is not stored by the video game 112, but is instead provided to or determined by another portion of the user computing system 110 external to the video game 112 and/or by the interactive computing system 130. Thus, in some embodiments, the user interaction history repository 116 may be optional or omitted.

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 8 and FIG. 9.

As previously discussed, it may be desirable to maintain or increase a user's level of engagement with the video game 112. One solution for maintaining or increasing the user's level of engagement with the video game 112 includes setting or adjusting a difficulty level of the video game 112 based at least in part on a user's skill and a user's desired level of challenge when playing the video game 112. The interactive computing system 130 can determine a level of difficulty for the video game 112 for a particular user and can modify the difficulty of the video game 112 based on the determination. This determination, as will be described in more detail below, of the difficulty level may be made based at least in part on user interaction information with respect to the video game 112 and/or other video games accessible by the user.

Interactive computing system 130 may include a number of systems or subsystems for facilitating the determination of the difficulty level for the video game 112 for a particular user and the modification of the difficulty level based on the determination. These systems or subsystems can include a difficulty configuration system 132, a user clustering system 134, a seed evaluation system 136, a user data repository 138, a retention analysis system 140, a model generation system 146, and a mapping data repository 144. Each of these systems may be implemented in hardware, and software, or a combination of hardware and software. Further, each of these systems may be implemented in a single computing system comprising computer hardware or in one or more separate or distributed computing systems. Moreover, while these systems are shown in FIG. 1A to be stored or executed on the interactive computing system 130, it is recognized that in some embodiments, part or all of these systems can be stored and executed on the user computing system 110.

In some embodiments, when the user computing system 110 is connected or in communication with the interactive computing system 130 via the network 104, the interactive computing system 130 may perform the processes described herein. However, in some cases where the user computing system 110 and the interactive computing system 130 are not in communication, the user computing system 110 may perform certain processes described herein using recent game play of the user that may be stored in the user interaction history repository 116.

The difficulty configuration system 132 sets or adjusts the difficulty level of a video game 112. In some cases, the difficulty configuration system 132 may set or adjust the difficulty level of the video game 112 by providing or adjusting values for one or more of the knobs 114, which are then fed into or provided to the video game 112. In some cases, the difficulty configuration system 132 sets or adjusts every available knob 114 each time a setting or an adjustment of a difficulty level is made. In other cases, the difficulty configuration system 132 may set or adjust less than every available knob 114 when setting or adjusting a difficulty level of the video game 112.

In some cases, the difficulty configuration system 130 may modify the difficulty of a portion of the video game 112 without constraint. However, in some other cases, the difficulty configuration system 132 may modify the difficulty of a portion of the video came 112 within a set of constraints that may be specified by a developer, a set of rules, or that are relative to other portions of the video game 112. For example, in some cases, the difficulty configuration system 132 may reduce the difficulty level of a particular portion of the video game 112 to no more than a difficulty threshold specified by a proceeding portion of the video game 112. Thus, in some cases, a reduction in the difficulty level of the particular portion of the video game 112 will not result in the particular portion of the video game 112 becoming easier than the proceeding portion 112. The difficulty adjustment may be turned off completely in some situations, such as during a tournament.

The model generation system 146 can use one or more machine learning algorithms to generate one or more prediction models or parameter functions. One or more of these prediction models may be used to determine an expected value or occurrence based on a set of inputs. For example, a prediction model can be used to determine an expected churn rate or a probability that a user will cease playing the video game 112 based on one or more inputs to the prediction model, such as, for example, historical user interaction information for a user. As another example, a prediction model can be used to determine an expected amount of money spent by the user on purchasing in-game items for the video game based on one or more inputs to the prediction model. In some cases, the prediction model may be termed a prediction model because, for example, the output may be or may be related to a prediction of an action or event, such as the prediction user continues to play the video game 112. A number of different types of algorithms may be used by the model generation system 146. For example, certain embodiments herein may use a logistical regression algorithm. However, other algorithms are possible, such as a linear regression algorithm, a discrete choice algorithm, or a generalized linear algorithm.

The machine learning algorithms can be configured to adaptively develop and update the models over time based on new input received by the model generation system 146. For example, the models can be regenerated on a periodic basis as new user information is available to help keep the predictions in the model more accurate as the user information evolves over time. The model generation system 146 is described in more detail herein. After a model is generated, it can be provided to the retention analysis system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The retention analysis system 140 can include one or more systems for determining a predicted churn or retention rate for a user based on the application of user interaction data for the user to a prediction model generated by the model generation system 140. In some cases, the difficulty configuration system 132 may use the predicted retention rate determined by the retention analysis system 140 to determine an adjustment to the difficulty of the video game 112. In some embodiments the adjustments to the difficulty are determined using data in a mapping data repository 144 to determine which features of the game to change and how to change the features.

The mapping data repository 144 can include one or more mappings between the output of a prediction model and a difficulty level of the video game 112, which may be used by, for example, the difficulty configuration system 132 to determine how to modify the video game 112 to adjust the difficulty of the video game 112. For example, if the user's predicted level of churn is "high," then the mapping data repository 144 may include a mapping between "high" and data to adjust the game to be "easy" such that one or more knobs or seeds associated with the game are set to values that make the game easier to play. As another example, if the user's predicted level of churn is 65%, then the mapping data repository 144 may include a mapping between "60-70%" to adjust a specific subset of the one or more knobs or seeds associated with the game to sets of values that make the game less difficult to play, but not the easiest to play. Alternatively, or in addition, the mapping may be between the output of the parameter function and one or more values for one or more knobs or seeds that can be used to modify the difficulty of the video game 112.

Further, generation and application of the parameter functions and their use in adjusting the difficulty level of the video game 112 will be described in further detail below with respect to the retention analysis system 140. In certain embodiments, the difficulty configuration system 132 may be or may include the model generation system 146. Moreover, in some cases, the difficulty configuration system 132 may be or may include the retention analysis system 140. As stated above, one non-limiting example of a machine learning algorithm that can be used herein is a clustering algorithm. The user clustering system 134 may facilitate execution of the clustering algorithm. The user clustering system 134 groups or divides a set of users into groups based at least in part on each user's skill level with respect to the video game 112 or other video games accessed by the users. Alternatively, or in addition, the user clustering system 134 may group or cluster the users based on one or more criteria associated with one or more of the users that impacts the users' engagement level with the video game 112 or other video games accessed by the users. Furthermore, the user clustering system 134 may identify or determine a set of difficulty preferences to associate with each user cluster identified or generated by the user clustering system 134.

The seed evaluation system 136, which may also be referred to as a lever evaluation system, evaluates a difficulty or a challenge provided by the video game 112 in response to a seed value. For example, the seed evaluation system 136 can determine how challenging a particular level or portion of the video game (such as a dungeon) generated in response to a particular seed value in a video game 112 is based on how well a group of users do playing the video game 112 when the particular seed value is utilized. Advantageously, in certain embodiments, by evaluating the challenge provided by a particular seed value, the difficulty level of the video game 112 can be refined by adding or removing the seed value to a set of available seed values for a particular difficulty level. For example, if it is determined that a seed value causes users to fail at an 80% rate, the seed value may be associated with the harder difficulty level than another seed value that causes users to fail at a 20% rate.

The user data repository 138 can store user interaction information associated with one or more users' interaction with the video game 112 and/or one or more other video games. This user interaction information can be obtained over one or more play sessions of the video game 112. Further, the user data repository 138 can store user cluster information associated with one or more user clusters generated by the user clustering system 134. In some cases, at least some of the data stored in the user data repository 128 may be stored at a repository of the user computing system 110. Each of the repositories described herein may include non-volatile memory or a combination of volatile and non-volatile memory.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Model Generation System

Figure 1B:
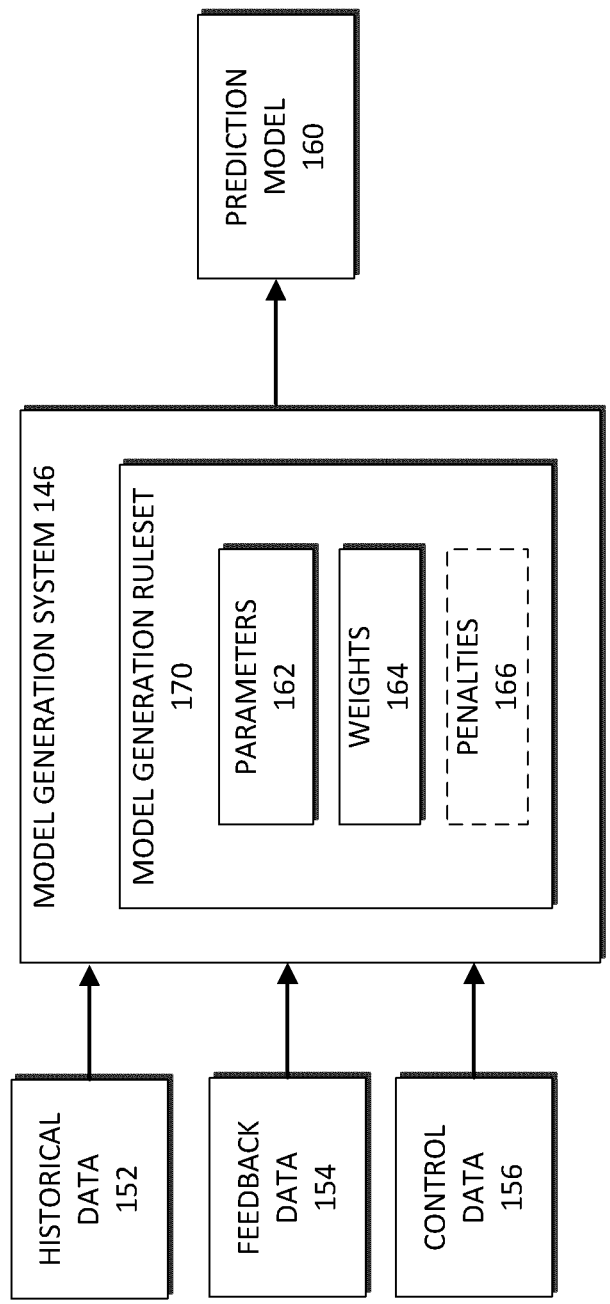
FIG. 1B illustrates an embodiment of a model generation system of FIG. 1A.

FIG. 1B illustrates an embodiment of the model generation system 146 of FIG. 1A. The model generation system 146 may be used to determine one or more prediction models 160 based on historical data 152 for a number of users. Typically, although not necessarily, the historical data 152 includes data associated with a large number of users, such as hundreds, thousands, hundreds of thousands, or more users. However, the present disclosure is not limited as such, and the number of users may include any number of users. Further, the historical data 152 can include data received from one or more data sources, such as, for example, an application host system (not shown) and/or one or more user computing systems 102. Further, the historical data 152 can include data from different data sources, different data types, and any data generated by one or more user's interaction with the video game 112. In some embodiments, the historical data 152 may include a very large number of data points, such as millions of data points, which may be aggregated into one or more data sets. In some cases, the historical data 152 may be accessed from a user data repository 138. In some embodiments, the historical data 152 is limited to historical information about the video game, but in other embodiments, the historical data 152 may include information from one or more other video games. Further, in some embodiments, one or more subsets of the historical data a limited by a date restriction, such as for example, limited to include only data from the last 6 months.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a length of time that the users played the video game 112. If the amount of time each user played the game is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate for the users whose data is included in the historical data 152.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a churn rate. In some embodiments, initial parameters 162 and weights 164 can be manually provided during the initiation of the model generation process. The parameters 162 and weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, game account information), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

Optionally, one or more of the prediction models 160 may be associated with a penalty 166. These penalties 166 may be used to facilitate the generation of or selection of a particular prediction model 160 based on one or more factors that are used to derive the penalty. For example, the mathematical complexity or the number of parameters included in a particular prediction model 160 may be used to generate a penalty for the particular prediction model 160, which may impact the generation of the model and/or a selection algorithm or a selection probability that the particular prediction model 160 is selected.

After the prediction model 160 has been generated, the model can be used during runtime of the retention analysis system 140 and/or the difficulty configuration system 132 to adjust the difficulty of the video game 112. In some cases, the adjustment of the difficulty may be dynamic and may occur during a user's interaction with the video game 112. Further, in some cases, the difficulty adjustment may occur in real-time or near real-time.

Example Retention Analysis System

Figure 1C:
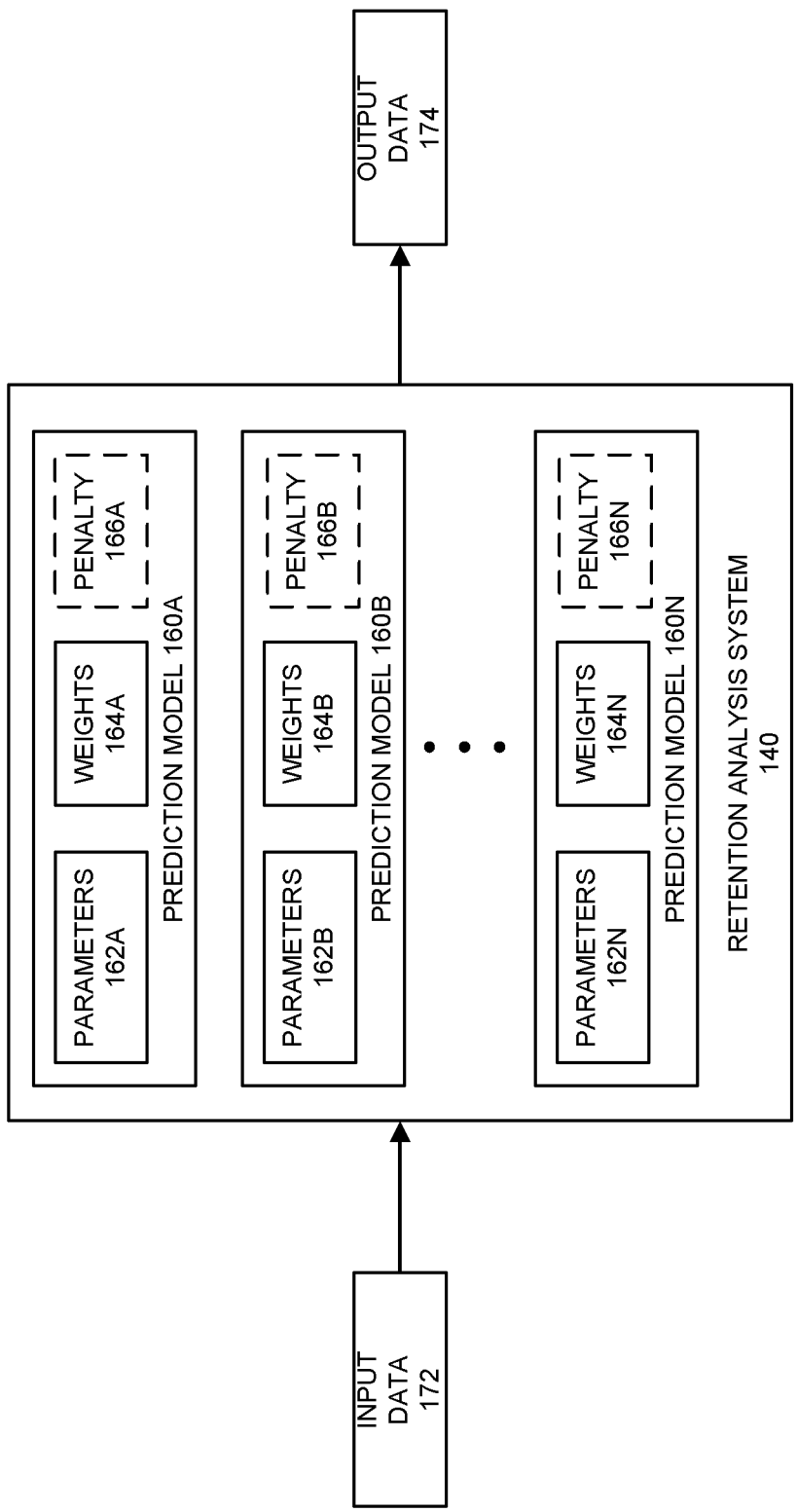
FIG. 1C illustrates an embodiment of a retention analysis system of FIG. 1A.

FIG. 1C illustrates an embodiment of a retention analysis system 140 of FIG. 1A. The retention analysis system 140 can apply or use one or more of the prediction models 160 generated by the model generation system 146. Although illustrated as a separate system, in some cases, the retention analysis system 140 may be included as part of the difficulty configuration system 132. The retention analysis system 140 may use one or more prediction models 160A, 160B, 160N (which may be referred to collectively as "prediction models 160" or in the singular as "prediction model 160") to process the input data 172 to obtain the output data 174.

The retention analysis system 140 may apply the prediction model(s) 160 during game play. In some embodiments, the prediction models 160 are applied at the beginning of the game to determine how to adjust the difficulty of the entire game. In other embodiments, the prediction models 160 are applied at different times during the game and/or at different stages in the game. During determination of a difficulty level for one or more portions of the video game 112, the retention analysis system 140 receives input data 172 that can be applied to one or more of the prediction models 160. The input data 172 can include one or more pieces of data associated with a user who is playing the video game 112. This data may include user interaction data for the video game 112, profile data for the user, and any other data that may be applied to the prediction model 160 to determine a retention or churn rate for the user. In some embodiments, the input data 172 can be filtered before it is provided to the retention analysis system 140.

In some embodiments, a single prediction model 160 may exist for the retention analysis system 140. However, as illustrated, it is possible for the retention analysis system 140 to include multiple prediction models 160. The retention analysis system 140 can determine which detection model, such as any of models 160A-N, to use based on input data 172 and/or additional identifiers associated with the input data 172. Additionally, the prediction model 160 selected may be selected based on the specific data provided as input data 172. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead.

As mentioned above, one or more of the prediction models 160 may have been generated with or may be associated with a penalty 166. The penalty may be used to impact the generation of the model or the selection of a prediction model for use by the retention analysis system 140.

The output data 174 can be a retention rate or churn rate associated with a prediction that a user ceases to play the video game 112. For example, in some embodiments, the retention rate may be between 0 and 100 indicating the predicted percentage of users associated with similar or the same data as included as input data 172 who would cease to play the video game 112 within a threshold time period. In some cases, the output data 174 may also identify a reason for the retention rate. For example, the retention analysis system 140 may indicate that the 90% retention rate for a particular user is based at least in part on the amount of money spent while playing the video game 112. However, the retention analysis system 140 may indicate that the 90% retention rate for another user may be based at least in part on the below freezing temperature in the geographic region where the user is located. As another example, the retention analysis system 140 may indicate that the 20% retention rate for a user may be based at least in part on the below 25% win ratio.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A). Optionally, one or more of the prediction models 160A, 160B, 160N may be associated with a penalty 166A, 166B, 166N, respectively (which may be referred to collectively as "penalties 166").

Example Machine Learning Process

Figure 2:
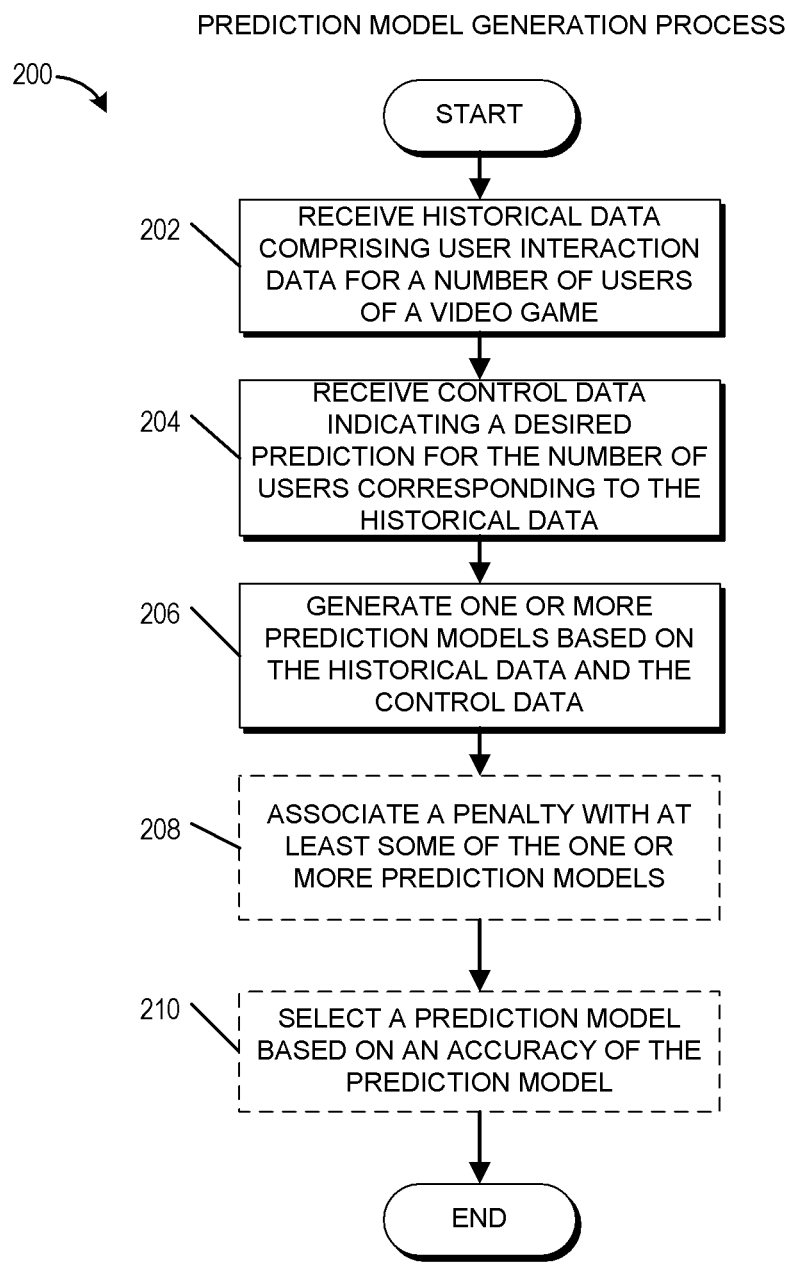
FIG. 2 presents a flowchart of an embodiment of a machine learning process.

FIG. 2 presents a flowchart of an embodiment of a machine learning process 200. The process 200 can be implemented by any system that can generate one or more parameter functions or prediction models that include one or more parameters. In some cases, the process 200 serves as a training process for developing one or more parameter functions or prediction models based on historical data or other known data. The process 200, in whole or in part, can be implemented by, for example, an interactive computing system 130, a difficulty configuration system 132, a user clustering system 134, a retention analysis system 140, a model generation system 146, or a user computing system 110, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per month, with the addition or release of a new video game, or with the addition of a threshold number of new users available for analysis or playing a video game 112. However, the process 200 may be performed more or less frequently.

The process 200 begins at block 202 where the model generation system 146 receives historical data 152 comprising user interaction data for a number of users of the video game 112. This historical data 152 may serve as training data for the model generation system 146 and may include user demographics or characteristics, such as age, geographic location, gender, or socioeconomic class. Alternatively, or in addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. Further, in some cases, the historical data 152 may include data related to the video game 112, such as one or more seed values used by users who played the video game 112. Additional examples of data related to the video game 112 that may be received as part of the historical data 152 may include settings for one or more knobs or state variables of the video game 112, the identity of one or more difficulty levels for the video game 112 used by the users, the type of the video game 112, and the like.

At block 204, the model generation system 146 receives control data 156 indicating a desired prediction for the number of users corresponding to the historical data. This control data 156 may indicate one or more features or characteristics for which the model generation system 146 is to determine a model. Alternatively, or in addition, the control data 156 may include a value for the features or characteristics that are associated with the received historical data 152. For example, the control data 156 may identify churn rate, or retention rate, as the desired feature to be predicted by the model that is to be generated by the model generation system 146. The churn rate or retention rate may correspond to a percentage of users associated with the historical data 152 that ceased playing the video game 112. Further, the control data 156 may identify a retention rate associated with the historical data. For example, the control data 156 may indicate that the retention rate is 60% for certain of the users whose data is included in the historical data 152. In some embodiments, the control data 156 may include multiple characteristics or features to be predicted by the model to be generated by the model generation system 146. For example, the control data 156 may identify both a retention rate and a reason for the retention rate (such as the difficulty of the video game 112 being too low or too high for the users whose data was provided as part of the historical data 152 at block 202), or a retention rate and an average monetary amount spent by the users whose data was provided as the historical data 152.

At block 206, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 206 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model 160 generation process. For example, the user may be aware that a particular region or geographic area had a power outage. In such a case, the user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160.

Optionally, at block 208, the model generation system 146 applies a penalty to or associates a penalty 166 with at least some of the one or more prediction models 160 generated at block 206. The penalty associated with each of the one or more prediction models 160 may differ. Further, the penalty for each of the prediction models 160 may be based at least in part on the model type of the prediction model 160 and/or the mathematical algorithm used to combine the parameters 162 of the prediction model 160, and the number of parameters included in the parameter function. For example, when generating a prediction model 160, a penalty may be applied that disfavors a very large number of variables or a greater amount of processing power to apply the model. As another example, a prediction model 160 that uses more parameters or variables than another prediction model may be associated with a greater penalty 166 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

The model generation system 146, at block 210, based at least in part on an accuracy of the prediction model 160 and any associated penalty, and selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 210 may be optional or omitted. For example, in some cases, the prediction models 160 may not be associated with a penalty. In some such cases, a prediction model may be selected from a plurality of prediction models based on the accuracy of the output generated by the prediction model.

Example Difficulty Based Seed Selection Process

Figure 3:
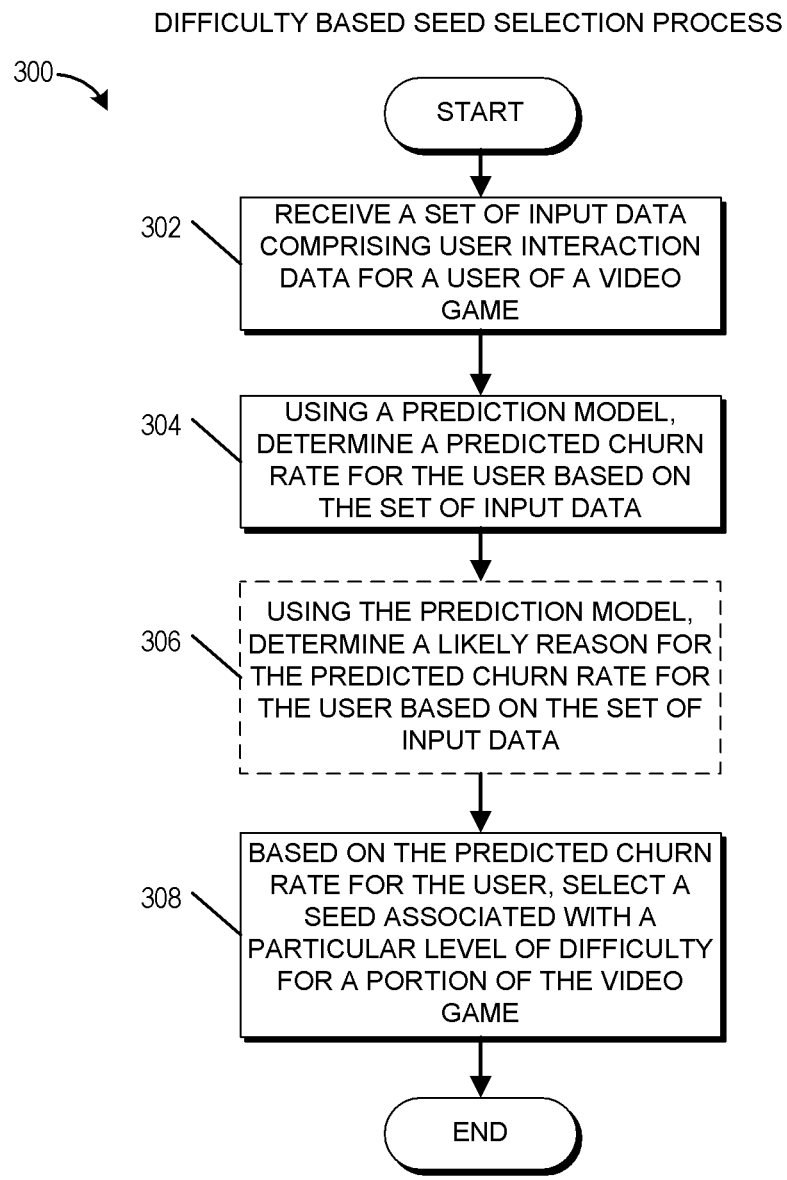
FIG. 3 presents a flowchart of an embodiment of a difficulty based seed selection process.

FIG. 3 presents a flowchart of an embodiment of a difficulty based seed selection process 300. The process 300 can be implemented by any system that can select a seed value for adjusting a difficulty of a video game based at least in part on the output of a prediction function or a parameter function. The process 300, in whole or in part, can be implemented by, for example, an interactive computing system 130, a difficulty configuration system 132, a user clustering system 134, a model generation system 146, a retention analysis system 140, or a user computing system 110, among others. Although any number of systems, in whole or in part, can implement the process 300, to simplify discussion, the process 300 will be described with respect to particular systems. Further, it should be understood that the process 300 may be updated or performed repeatedly over time. For example, the process 300 may be repeated for each play session of a video game 112, for each round of the video game 112, each week, each month, for every threshold number of play sessions, for every threshold number of times a user loses or fails to complete an objective, each time a win ratio drops below a threshold level, and the like. However, the process 300 may be performed more or less frequently.

The process 300 begins at block 302 where the retention analysis system 140 receives a set of input data (such as the input data 172) comprising user interaction data for a user of the video game 112. This input data 172 is typically, although not necessarily, user specific data. Further, the set of input data 172 may include both historical user interaction data and recent user interaction data for the user. Historical user interaction data may include user interaction data from a noncurrent play session and/or user interaction data that satisfies a threshold age or that is older than a particular threshold time period. For example, the historical user interaction data may include user interaction data that is at least a week or a month old. Alternatively, or in addition, the historical user interaction data may include data from play sessions that are more than 5 or 10 play sessions old.

Conversely, the recent user interaction data may include user interaction data that satisfies a threshold age or that is more recent than a particular threshold time period. For example, the recent user interaction data may include user interaction data that is less than a week or a month old. Alternatively, or in addition, the recent user interaction data may include data from play sessions that are less than 3, 5, or 10 play sessions old.

In some embodiments, the historical user data and the recent user data may be weighted differently within the prediction model 160. In some cases, each parameter 162 within the prediction model 160 may be repeated. For example, one version of the parameter may be based on the historical user data and may be associated with one weight 164 and another version of the parameter may be based on the recent user data and may be associated with a different weight 164. Moreover, in some implementations, the weight may be applied on a sliding scale or a graduated basis. For example, more recent historical user data may be associated with a higher weight 164 and less recent historical user data.

At block 304, the retention analysis system 140, using a parameter function or a prediction model 160, may determine a predicted churn rate for the user based at least in part on the set of input data 172 received at block 302. The predicted churn rate for the user may be determined at the beginning of game play, and/or at various stages or at various time frames during game play. The determined or calculated output 174 of the prediction model 160 may be a predicted churn rate or an expected churn for users with the same or substantially similar input data as the set of input data received at block 302. Further, the churn rate may indicate the percentage of users or the likelihood that a user will continue to play or not continue to play the video game 112 based on the set of input data received at block 302. For example, if a churn rate of 75% is output by the retention analysis system 140, then it may be estimated that there is a 75% chance that the user will not continue to play the video game 112. Alternatively, or in addition, the churn rate of 75% may indicate that 75% of users with the same or similar user interaction data that is associated with the set of input data received at the block 302 will cease playing the video game 112 generally, after a certain amount of time, or at a specific point in the game. In some embodiments, the prediction model 160 may predict the amount of time the user is predicted to play the video game 112 over a particular time period or until ceasing to play the video game 112. This determination may be for a particular play session or for a number of play sessions and may be instead of or in addition to determining the retention rate.

Optionally, at block 306, using the prediction model 160, the retention analysis system 140 determines a predicted reason for the predicted churn rate for the user based on the set of input data 172. For example, the parameter function may determine based on an input data indicating a win ratio below a threshold that the churn rate calculated by the parameter function is based at least in part on the difficulty of the video game 112.

At block 308, based on the predicted churn rate for the user determined at block 304, the difficulty configuration system 132 selects a seed associated with a particular level of difficulty for a portion of the video game. Selecting the seed may include accessing mapping data at the mapping data repository 144. This mapping data may indicate a mapping between one or more churn rates and one or more difficulty levels for the video game 112. In some cases, the churn rate above a particular threshold level may be mapped to one or more seed values that may reduce the difficulty of the video game 112. Further, in some cases, a churn rate may be mapped to different sets of seed values associated with different difficulty levels. In such cases, the set of seed values associated with a particular difficulty level may be selected based on an additional output 174 of the retention analysis system 140. For example, the retention analysis system 140 may output a churn rate and a reason for the churn rate for a particular user. Such an example, a churn rate above a particular threshold may cause a new seed value to be selected. Further, the reason for the churn rate may be used to select a plurality of seed values associated with different difficulty levels. The reason for the churn rate may be associated with particular numeric values. For example, a churn rate above a particular threshold caused by the video game 112 being too easy may be associated with one numeric value in a churn rate above a particular threshold caused by the video game 112 being too hard may be associated with another numeric value.

In some embodiments, the retention analysis system 140 may output the one or more factors or data from the input data 172 that had the most impact or a threshold amount of impact in determining the retention rate for the user. Using this information, the difficulty configuration system 132 may identify one or more changes to state variables of the video game 112, or one or more seed values, that correspond to the factors used to generate the retention rate.

In some cases, the mapping between the output from the retention analysis system 140 and the seed values may be a multistage mapping. For example, a first mapping may be between the churn rate output by the retention analysis system 140 and a plurality of seed values, and a second mapping may be between another output of the retention analysis system 140 (such as a predicted reason for the churn rate) and a particular seed value or subset of seed values from the plurality of seed values. In another implementation, the multistage mapping may include a first stage mapping between the churn rate and a particular difficulty level, and a second stage mapping between the particular difficulty level and one or more seed values or knob values.

In some cases, the seeds are adjustments to knobs were state variables used to modify execution of the video game 112. In other cases, the seeds are values used in random or pseudorandom number generators that are used to modify the probability or the occurrence rate of one or more events within the video game 112. Further, in some cases, the seeds are values used to affect the generation of a level or a portion of the video game 112 and/or the location of a user playable character within the video game 112.

In some cases, one or more of the above embodiments may be combined with clustering to facilitate identifying users who may prefer to play video games that are more or less difficult. Some example embodiments of clustering the may be used with the present disclosure are described in more detail below.

Example Clustering Embodiments

In some embodiments, a clustering process may be used to group users who share one or more characteristics that may be used to identify difficulty preferences for a video game 112. Clusters may include one or more users that share one or more characteristics. Difficulty preferences can be associated with each cluster to facilitate adjusting the difficult of the video game 112. A user whose characteristics match a particular cluster, may be assigned to the particular cluster. A difficulty level of the video game 112 can be adjusted for the user based on difficulty preferences associated with the cluster. Certain non-limiting example processes are described below that enable difficult adjustment using clustering.

Example Cluster Creation Process

Figure 4:
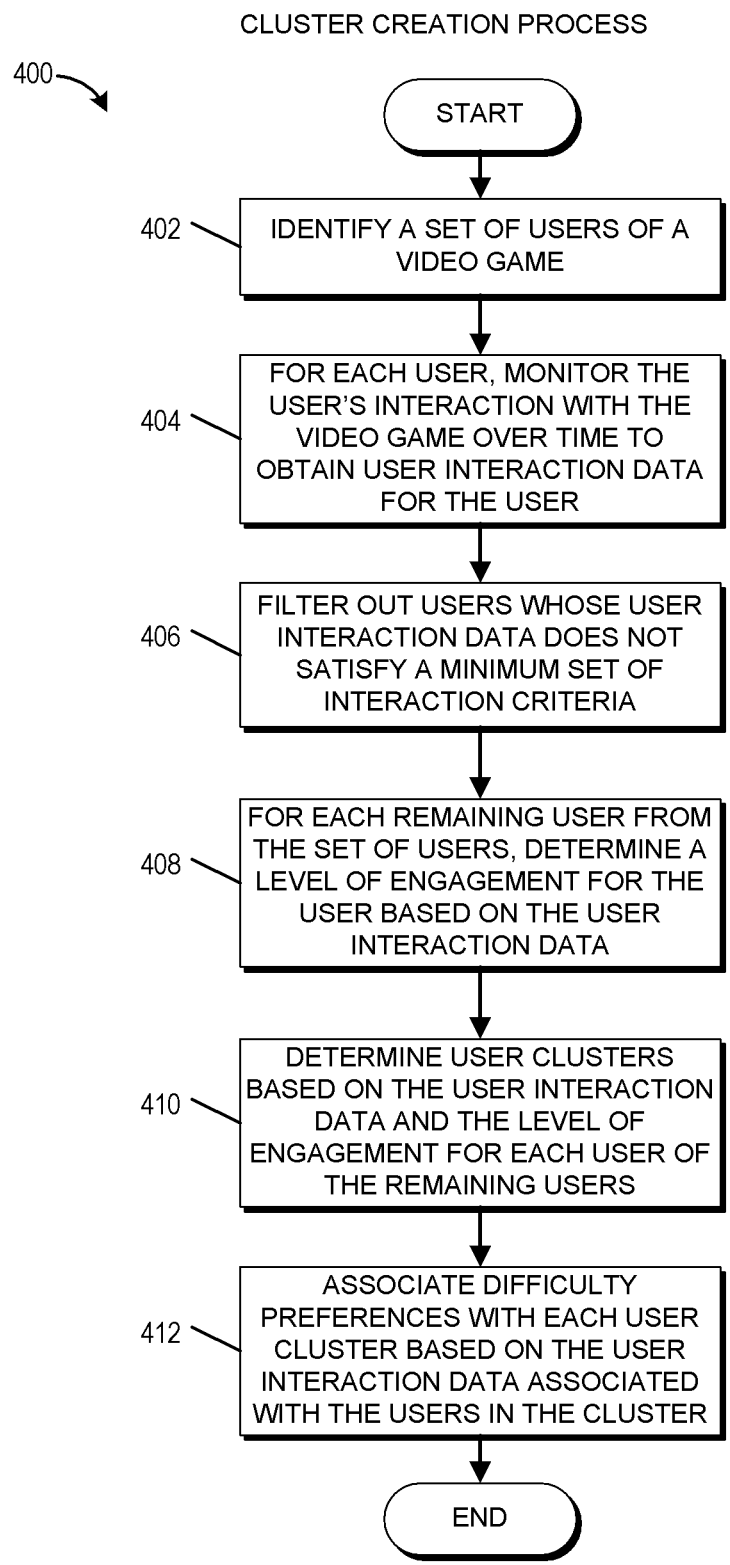
FIG. 4 presents a flowchart of an embodiment of a cluster creation process.

FIG. 4 presents a flowchart of an embodiment of a cluster creation process 400. The process 400 can be implemented by any system that can create a plurality of clusters or groups of users based on each user's interaction with a video game and the level of engagement associated with each user. For example, the process 400, in whole or in part, can be implemented by an interactive computing system 130, a difficulty configuration system 132, a user clustering system 134, or a user computing system 110, among others. Although any number of systems, in whole or in part, can implement the process 400, to simplify discussion, the process 400 will be described with respect to particular systems. Further, it should be understood that the process 400 may be updated or performed repeatedly over time. For example, the process 400 may be repeated once per month, with the addition or release of a new video game, or with the addition of a threshold number of new users available for analysis or playing a video game 112. However, the process 400 may be performed more or less frequently.

The process 400 begins at block 402 where the user clustering system 134 identifies a set of users of the video game 112. To simplify discussion, the process 400 is primarily described with respect to a single video game, such as the video game 112. However, this disclosure is not limited as such, and the process 400 can be implemented for a plurality of video games. In some cases, each of the plurality of video games may be of the same genre or may share one or more characteristics in common. In other cases, the plurality of video games may be distributed across a number of genres. The genres may be based on theme and/or game type (for example, an open world game, a role-playing game, a first-person shooter, a side scrolling game, a simulation, a space fighter, a western, and the like). Further, in some cases, the process 400 includes analyzing data across additional video games to confirm or refine the clusters created based on the analysis of a video game.

At block 404, for each user identified at the block 402, the user clustering system 134 monitors the user's interaction with the video game 112 over time to obtain user interaction data for the user. This monitoring can be done by reviewing sets of user interaction data for the user from different time periods or by pulling data from the video game 112 in real time and storing the data for later review. This user interaction data can include any of the information previously described with respect to FIG. 1A. Further, the user interaction data may include data relating to the users progress within the video game; the action taken by the user when the user succeeds in completing a level or objective; the action taken by the user when the user does not succeed in completing a level or objective; differences in actions taken by the user based on the length of time it takes the user to succeed at an objective; the length of time the user plays the video game each time or on average when the user plays the video game; whether the user typically plays the game for short periods of time or long periods of time; whether the user spends real world currency (as opposed to in-game currency) when playing the video game, which may be used as a factor to identify the users level of engagement (for example, a user spends money while playing a video game is more likely to play the game again compared to a user who does not spend money or playing a video game); and any other criteria that can be used to measure the users level of engagement with the video game and/or the user's action in response to the level of challenge that the video game presents to the user. Further, user interaction data may also include information relating to the type of user computing system 110 used by the user to access the video game; differences, if any, and how the user interacts with the video game based on the type of user computing system 110 used to access the video game; whether the user uses multiple user computing systems 110 to access the video game; and the like.

At block 406, the user clustering system 134 filters out users whose user interaction data does not satisfy a minimum set of interaction criteria. This minimum set of interaction criteria may be related to the length of time that the user played the game or to whether the user played the video game for multiple play sessions. For example, a user who played the video game less than a threshold amount of time or for less than a threshold number of play sessions may not have provided sufficient data to determine whether the video game's difficulty impacted the user's level of engagement. Further, the minimum set of interaction criteria may be related to the type of actions the user has taken in the video game 112 or the progress the user has made in the video game 112. In some cases, users whose user interaction data does not satisfy the minimum set of interaction criteria may be retained, but weighted lower compared to user interaction data for users that does satisfy the minimum set of interaction criteria. In some embodiments, the block 406 may be optional or omitted.

For each remaining user from the set of users, the user clustering system 134 determines a level of engagement for the user based on the user interaction data for that user at block 408. Determining the level of engagement for the user may include determining whether the user continues to play or stops playing a video game based on the user's progress within the video game. Further, determining the level of engagement for the user may include determining whether and/or how much money the user spends while playing the video game. In some cases, determining the level of engagement for the user may include determining a probability that the user will play the video game again based on the user interaction data collected for the user. In some cases, determining the level of engagement for the user may include determining the user's skill with respect to the video game. Further, performing the operations associated with the block 408 may include applying one or more machine learning algorithms using the user interaction data as input to determine a probability that the user continues to play or stops playing the video game based on the amount of challenge presented to the user by the video game.

At block 410, the user clustering system 134 determines a number of user clusters based on the user interaction data and the level of engagement for each user of the remaining users. Determining the user clusters may include grouping users based on their behavior as determined from the user interaction data monitored at the block 404. Further, grouping the users into the user clusters may include identifying characteristics associated with each user based on the user interaction data collected for the users that indicate a level of engagement with the video game. For example, suppose that the system determines that a number of users typically play the video game for less than 30 minutes and tend to succeed at an objective in less than two attempts over the course of a threshold number of play sessions and/or objectives. Further, suppose that these users typically stop playing the video game after reaching some number of objectives that require more than two attempts to complete the objectives. This number of users may be clustered together in a user cluster for users who tend to play short game sessions and tend to prefer video games that are not challenging. In contrast, another group of players who tend to play video games for two hours at a time and continue to play the video game despite objectives taking several attempts to complete may be clustered together in a separate user cluster. One or more machine learning algorithms may be used to identify the clusters of users based at least in part on the user interaction data for the set of users.

In some cases, block 410 may include generating subclusters within each cluster. For example, one cluster may include users who tend to prefer video games that are particularly challenging. Within this cluster, there may be two subclusters. One subcluster may be for users who tend to prefer video games that remain challenging throughout the course of the entire game. Another subcluster may be for users who tend to prefer video games that are challenging in the beginning, but may become less challenging over time as may occur with video games that are difficult to master, but are less difficult once the user masters the skills required by the video game.

At block 412, the difficulty configuration system 132 associates difficulty preferences with each user cluster based on the user interaction data associated with the users in the user cluster. In some embodiments, a machine learning model may be generated by, for example, the model generation system 146, to determine which values for difficulty preferences are associated with longer game play compared to other values for the difficulty preferences. The difficulty preferences may identify whether users associated with the user cluster prefer to play a video game that is difficult, easy, or some gradation in between. Further, the difficulty preferences may identify one or more values resetting one or more knobs were game state variables associated with the video game.

Example Cluster Assignment Process

Figure 5:
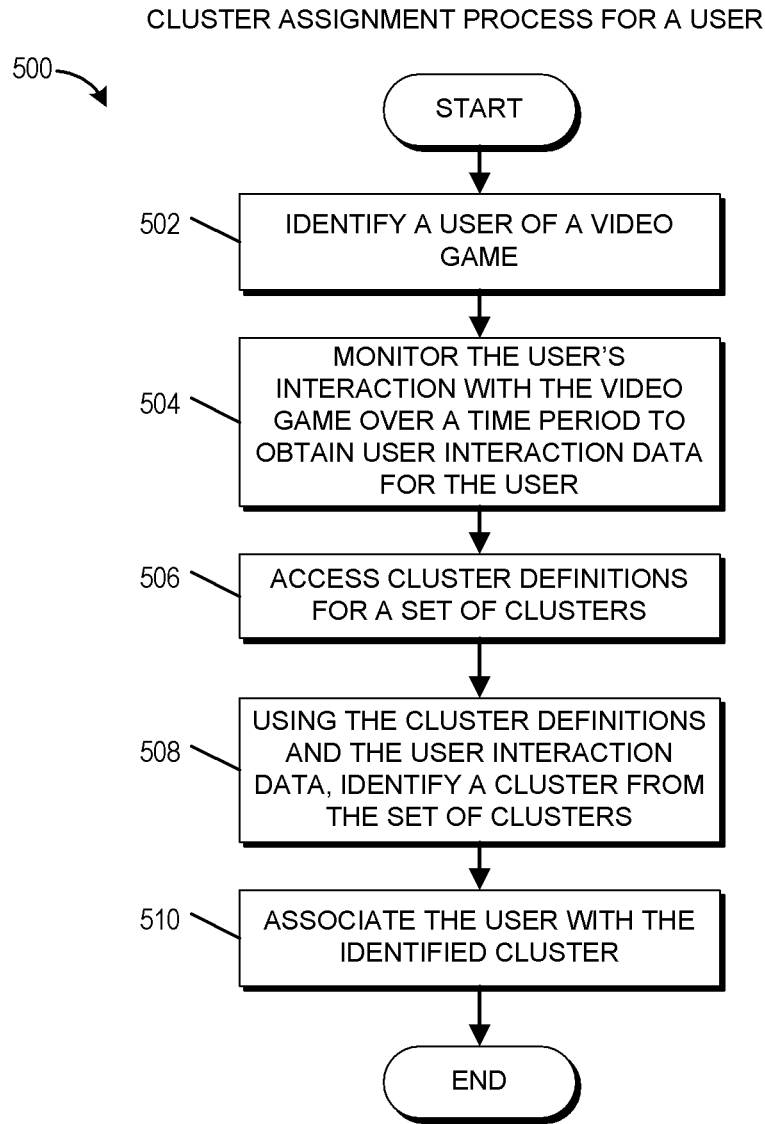
FIG. 5 presents a flowchart of an embodiment of a cluster assignment process for a user.

FIG. 5 presents a flowchart of an embodiment of a cluster assignment process 500 for a user. The process 500 can be implemented by any system that can identify a user cluster with which to associate a user based on the user's interaction with a video game. For example, the process 500, in whole or in part, can be implemented by an interactive computing system 130, a difficulty configuration system 132, a user clustering system 134, or a user computing system 110, among others. Although any number of systems, in whole or in part, can implement the process 500, to simplify discussion, the process 500 will be described with respect to particular systems. Further, it should be understood that the process 500 may be updated or performed repeatedly over time. For example, the process 500 may be repeated once per month, after a threshold number of play sessions by the user since a prior performance of the process 500, or after the user plays a new video game. However, the process 500 may be performed more or less frequently. Furthermore, the process 500 may be performed in real time or may be performed in advance of a particular event. For example, the process 500 may be performed upon user registration with a game deployment system or upon the user accessing the video game 112.

The process 500 begins at block 502 where the user clustering system 134 identifies a user of the video game 112. The user may be identified based on user account information, such as a user login, or based on information associated with an avatar of the user, such as a screen name. Alternatively, or in addition, a user may be identified based on information associated with a user computing system 110 of the user, such as an Internet protocol (IP) address.

At block 504, the user clustering system 134 monitors the user's interaction with the video game 112 over a time period to obtain user interaction data for the user. This monitoring can be done by reviewing sets of user interaction data for the user from different time periods or by pulling data from the video game 112 in real time and storing the data for later review. Typically, the time period is a historical time period that may include the user's interaction with the video game 112 over multiple play sessions. Further, the length of the time period may be selected to satisfy or exceed a minimum time threshold. For example, the time period may be selected to be at least, or to exceed, one month, two months, half a year, and the like. In some cases, instead of or in addition to monitoring the user's interaction with the video game over a time period, the user clustering system 134 may be configured to monitor the user's interaction over a threshold number of play sessions. For example, the user clustering system 134 may be configured to monitor the first number (for example, five, ten, twelve, and the like) of play sessions of the user or the most recent number of play sessions of the user. In some cases, the block 504 may include monitoring the user's interaction with a plurality of video games. The plurality of video games may be video games of the same type as the video game 112. In other cases plurality of video games may not be limited to a particular type of video game.

The user clustering system 134 accesses cluster definitions for a set of clusters at block 506. Accessing the cluster definitions for the set of clusters may include accessing a user data repository 138. The cluster definitions may include a set of characteristics that correlate to or are derived from user interaction data for a set of users.

Using the cluster definitions accessed at the block 506 and the user interaction data obtained at the block 504, the user clustering system 134 identifies a cluster from the set of clusters at the block 508. Identifying the cluster from the set of clusters may include matching characteristics of the user interaction data with characteristics associated with each of the set of clusters. For example, if the user interaction data indicates that the user plays the video game 112 for several hours at a time when successfully completing objectives and ceases to play the video game 112 within about 10 minutes on average when failing to complete an objective, then the user clustering system 134 may determine that the user is a player who spends significant time playing video games and does not enjoy significant challenge. Continuing this example, the user clustering system 134 may identify the user cluster from the set of clusters that is associated with players who play video games for a significant amount of time and tend to enjoy games with less than a threshold level of difficulty.

In some cases, the determination of the cluster from the set of clusters may include identifying how difficult the user finds the video game 112 based on the user interaction data obtained at the block 504. Further, the determination of the cluster of a set of clusters may include identifying the user's actions or reactions to events within the video game including events relating to the success or failure of the user in overcoming challenges within the video game 112. Engagement characteristics or user interaction characteristics for the user with respect to the video game may be determined based on the user's behavior with respect to the success or failure of satisfying objectives within the video game 112. These engagement characteristics and/or other characteristics related to the user that are derived from the user's interaction with the video game may be compared to characteristics associated with the set of clusters to identify a corresponding cluster to associate with the user.

In some embodiments, the engagement characteristics may be presented to the user and, in response, the user clustering system 134 may receive input from the user regarding the engagement characteristics. For example, the user may indicate whether the user agrees with the analysis. As another example, the user may indicate that he or she was experimenting with a new play style that the user does or does not plan to continue using. The user clustering system 134 may use the user input to adjust or confirm its selection of a particular user cluster. In some cases, the user input may be weighted based on the amount of data the user clustering system 134 has obtained at block 504. For example, the user input may be weighted more heavily for users with a little history (such as two or three play sessions) and weighted less heavily for users with a significant amount of history (such as fifty or a hundred play sessions).

In some cases, the interactive computing system 130 may cause sliders, or some other user interface element, to be displayed to the user to indicate the user's engagement characteristics on a spectrum. For example, the slider may indicate that the user tends to attempt challenges more often than average or that the user on average tends to be more successful at certain challenges than other users. Although the analysis of the user interaction data may be presented to the user, the user may not be informed that the information is being used to adjust the difficulty level of at least portions of the video game 112.

After the user has played a portion of the video game 112, the user clustering system 134 may question the user to help determine user preferences or to obtain information regarding how the user viewed the difficulty of the portion of the video game 112. The user may be questioned after the user indicates that the user is ending a play session. Thus, the user can be questioned regarding his or her experience without interrupting the user's play experience. Further, the user clustering system 134 may parse chat message data of the user to determine the user's engagement level and/or how difficult the user finds the video game 112.

At block 510, the user clustering system 134 associates the user with the identified cluster. Associating the user with the identified cluster may include storing an association between the user and the identified cluster at the user data repository 138.

In some embodiments, the process 500 may be used to determine how likely a user is to stop playing the video game 112. This determination can sometimes be referred to as a "churn rate" or "churn" and can be associated with how often a user switches video games or stops playing certain video games. For example, a user who tends to play video games for one or two play sessions and then move on to another video game may have a high churn rate. By identifying such users, it may be possible to modify the difficulty settings of the video game to reduce the rate of churn. For example, if it is determined that simple games, or games that do not provide an adequate challenge for the user results in the user ceasing to play such games, the user may be associated with a cluster of users who prefer difficult video games. Further, as is described in more detail below, based on the identity of the cluster to associate with the user, the difficulty of the video game 112 may be refined in an effort to reduce the probability that the user ceases to play the video game 112.

Example Difficulty Setting Process

Figure 6:
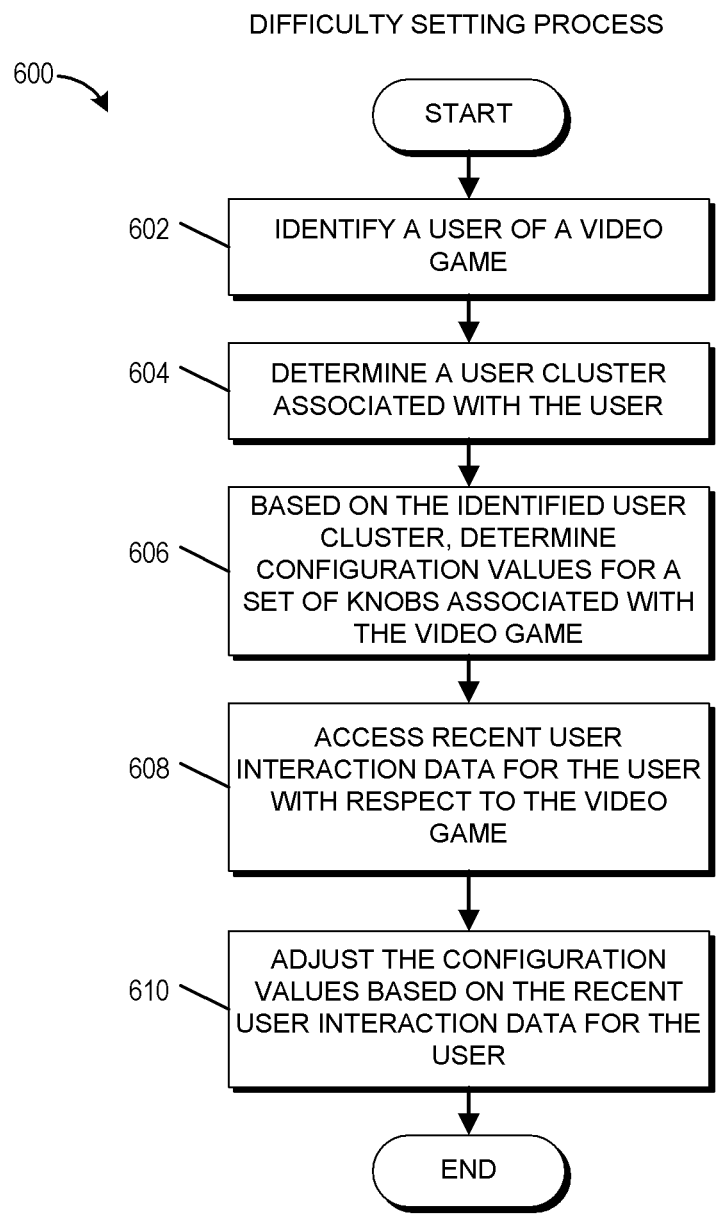
FIG. 6 presents a flowchart of an embodiment of a difficulty setting process for an application.

FIG. 6 presents a flowchart of an embodiment of a difficulty setting process 600 for an application, such as the video game 112. The process 600 can be implemented by any system that can dynamically set or adjust the difficulty of a video game based at least in part on monitor activity of the user. For example, the process 600, in whole or in part, can be implemented by an interactive computing system 130, a difficulty configuration system 132, a user clustering system 134, or a user computing system 110, among others. Although any number of systems, in whole or in part, can implement the process 600, to simplify discussion, the process 600 will be described with respect to particular systems.

The process 600 may be performed when the video game 112 is executed or when a play session of the video game 112 is started. In some cases, the process 600 may be performed when a user begins a new game or starts a new account with respect to video game 112. Further, the process 600 may be performed each time the user loads a previously saved game with respect to the video game 112. In some cases, the process 600 may be performed, or repeated, at a particular time or in response to a trigger event within the video game 112. For example, the process 600 may occur each time the user fails to complete or succeeds in completing particular objectives within the video game 112. In some cases, the process 600 may occur after a threshold number of objectives are completed or after a threshold number of attempts to complete an objective are unsuccessful.

The process 600 begins at block 602 where the difficulty configuration system 132 identifies a user of the video game 112. In some cases, the block 602 is performed in response to the user accessing the video game 112. However, as described above, one or more portions of the process 600 may be performed in response to other events, such as in game trigger events. Identifying the user of the video game 112 may be based on a user identifier or avatar. In some cases, the block 602 may include one or more of the embodiments previously described with respect to the block 502.

At block 604, the difficulty configuration system 132 determines a user cluster associated with the user. Determining a user cluster associated with the user may include accessing a user data repository 138 to identify one or more clusters associated with the user. In some cases, the user cluster may be associated with both the user and the video game 112. In some such cases, the user may be associated with multiple user clusters. For example, the user may be associated with a different user cluster for each video game played by the user. In other cases, the user may be associated with a single user cluster for a set of video games. In some cases, the set of video games may be all video games played by the user or all video games published by an entity associated with the interactive computing system 130. In other cases, the set of video games may be video games of a specific genre or theme.

Based on the identified user cluster, the difficulty configuration system 132 determines configuration values for a set of one or more knobs associated with the video game 112. These configuration values may be identified by the user cluster. Alternatively, the configuration values may be determined based on a difficulty level associated with the user cluster. In some cases, at least some of the configuration values are specific or fixed values associated with the user cluster or determined based on characteristics associated with the user cluster. Alternatively, or in addition, at least some of the configuration values may be selected using an algorithm or randomly from a particular pool or set of values associated with the user cluster.

At block 608, the difficulty configuration system 132 accesses recent user interaction data for the user with respect to the video game 112. This recent user interaction data may be provided to the difficulty configuration system 132 by the video game 112. Alternatively, or in addition, the difficulty configuration system 132 may access the recent user interaction data from the user interaction history repository 116. In yet other cases, the difficulty configuration system 132 may access the recent user interaction data from the user data repository 138.

The recent user interaction data may include user interaction data collected during a current play session, within a threshold time period (for example, within the last week), or within a threshold number of play sessions (for example, the most recent three play sessions). Generally, although not necessarily, the time period or the number of play sessions from which the recent user interaction data is collected is less and/or more recent than the historical data used with respect to the process 500 to determine a user cluster associated with the user.

Advantageously, in certain embodiments, by accessing the user cluster associated with the user and by accessing the recent user interaction data, the difficulty configuration system 132 can make a prediction as to the user's success at playing the video game 112 with a particular level of difficulty. Further, the difficulty configuration system 132 can make a prediction regarding the user's behavior with respect to the video game 112. Based at least in part on these predictions, the difficulty configuration system 132 can select configuration values that can be sent to the video game 112 to adjust the difficulty of the video game 112 accordingly. In some embodiments, the block 606 or the block 608 may be optional or omitted. For example, in cases where the user has not previously played the video game 112, the block 608 may be omitted. As another example, in cases where the user has not accumulated enough historical user interaction data to associate the user with a user cluster, the block 606 may be omitted. Alternatively, the user may be associated with a default user cluster so as to determine an initial set of configuration values for the set of knobs associated with the video game 112. As another alternative, the user may be associated with a user cluster based at least in part on information provided by the user.

At block 610, the difficulty configuration system 132 may adjust the configuration values for the set of knobs based at least in part on the recent user interaction data for the user. Adjusting the configuration values may make the video game 112 easier or more challenging for the user. Further, adjusting the configuration values may modify the state of the video game 112 and/or number of features associated with the video game 112. For example, adjusting the configuration values may modify the layout of a level within the video game 112. As another example, adjusting the configuration values may modify the timing of item drops within the video game 112 and/or the type of item drops within the video game 112. In some cases, the configuration values may be seed values that are used by the video game 112 in generating one or more aspects of the video game 112, such as a level layout or a start position of a user controlled character within the video game 112. It should be understood that the present disclosure does not limit the type of modifications that may be made to the video game 112. However, typically, the modifications made to the video game 112 will result in an adjustment of the level of difficulty of the video game 112. Advantageously, in certain embodiments, by adjusting particular knobs within the video game 112 based on historical and/or recent user interaction data, the difficulty of the video game 112 may be adjusted in a more granular basis compared to static difficulty level settings associated with some video games.

In some cases, adjusting the difficulty settings for the video game may include changing configuration values that adjust a defined set of features in the video game 112. Alternatively, the difficulty configuration system 132 may determine configuration settings based at least in part on an evaluation of specific skills of the user as determined from the recent user interaction data. For example, it may be determined that the user is failing a number of objectives in the video game 112 because the user has trouble timing jumps. If the user is a type of user who will stop playing a video game 112 when the user has trouble completing objectives, as determined by the user cluster associated with the user, the difficult configuration system 132 may generate configuration values for the capabilities of the playable character in the video game 112 to make it easier to time the jumps (for example, by allowing the character to jump farther). In contrast, if another user does not have a problem timing jumps, but has trouble aiming a weapon, the difficulty configuration system 132 may generate configuration values that make it easier to shoot objectives by making the hit area of a weapon larger. In some cases, both of these changes may be made without the users realizing that the game has been modified.

In some cases, the block 610 may include the difficulty configuration system 132 providing the video game 112 and/or the user computer system 110 the adjusted configuration values for the set of knobs. Providing the adjusted configuration values to the user computing system 110 may include providing the adjusted configuration values over a communication channel established between the interactive computing system 130 and the user computing system 110. In some cases, communication channel may be between the video game 112 and the difficulty configuration system 132. In some cases, the adjusted configuration values may be provided as a configuration file (for example, a markup language file, such as an XML file) that may be accessed by the video game 112 and/or that may override a configuration file of the video game 112. In some cases, the adjuster configuration values may be provided in a shared library file such as a dynamic link library (DLL) file.

Although the process 600 may be used to provide configuration values that adjust the difficulty setting of the video game 112, in some cases, the adjustment to the difficulty level of the video game 112 is bounded. For example, in some cases, the developer of the video game 112 may desire for each odd level to be easier than each even level within the video game 112. Thus, the player will alternate between easier and harder levels while playing the video game 112. In such a case, the adjustment to the configuration values at the block 610 may be restricted such that the odd levels remain easier than the even levels within the video game 112. As another example, adjustments to the difficulty level of different portions of the video game 112 may be restricted to particular range. Thus, in some cases, although later levels in the video game 112 may be made more or less difficult compared to earlier levels, the later levels may still remain more difficult than the earlier levels.

In some embodiments, the process 600 may be performed at least in part by the user computing system 110. For example, in cases where the user computing system 110 does not have a network connection to the interactive computing system 130, the video game 112 may be configured to dynamically adjust its difficulty based at least in part on user interaction data stored in the user interaction history repository 116. Further, in some cases, the interactive computing system 130 may provide user cluster information to the user computing system 110 for storage enabling the user computing system 110 to perform the process 600 at times when the user computing system 110 does not have a network connection to the interactive computing system 130.

Example Seed Evaluation Process

Figure 7:
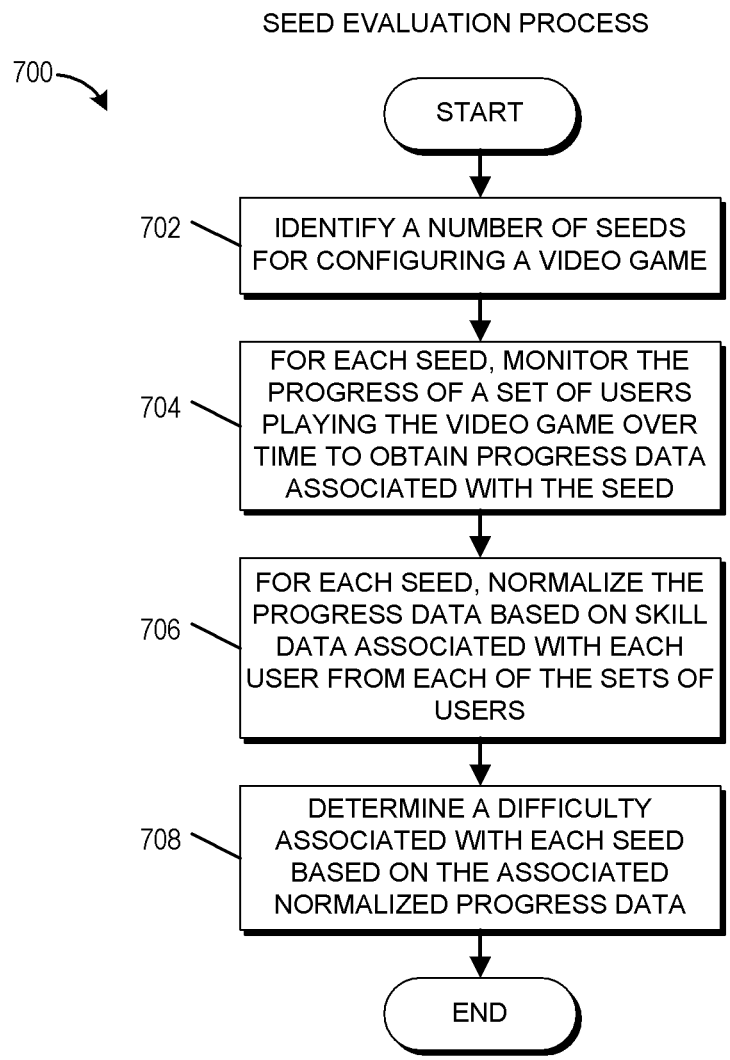
FIG. 7 presents a flowchart of an embodiment of a seed evaluation process.

FIG. 7 presents a flowchart of an embodiment of a seed evaluation process 700. The process 700 can be implemented by any system that can evaluate the difficulty of a portion of the video game 112 based at least in part on the use of a particular seed value with respect to the portion of the video game 112. For example, the process 700, in whole or in part, can be implemented by an interactive computing system 130, a seed evaluation system 136, a difficulty configuration system 132, or a user computing system 110, among others. Although any number of systems, in whole or in part, can implement the process 700, to simplify discussion, the process 700 will be described with respect to particular systems.

The seed evaluated using the process 700 can relate to the generation of a number of aspects or portions of the video game 112. For example, the seed may be used to determine an initial configuration of an in-game world or level. As another example, the seed may be used to determine the abilities of one or more playable or non-playable characters within the video game 112.

The process 700 begins at block 702 where the seed evaluation system 136 identifies a number of seeds for configuring a video game 112 or a portion of the video game 112. In some cases, each of the number of seeds may be associated with configuring the same portion of the video game 112.

For each seed identified at the block 702, the seed evaluation system 136 monitors the progress of the set of users playing or accessing the video game 112 over time to obtain progress data associated with the seed at block 704. In some cases, each seed will be evaluated with a different set of users because, for example, only one seed may be used during a particular play session with a particular account of a particular user for some types of video games. For example, if the seed value is associated with a layout of a particular level, it is possible that the layout of the particular level will not change once set for a particular user. However, in some other cases, each seed may be evaluated with the same set of users because, for example, the seed values are used repeatedly during play sessions of the video game. For example, if the seed value is associated with a starting set of cards in a card battle game, a starting set of cards may be generated each time the user plays a round providing an opportunity for a number of different seed values to be evaluated with a particular user.

In some implementations, the set of users monitored at the block 704 are selected based on the skill level associated with the set of users or a user cluster associated with a set of users. For example, each of the seed values may be evaluated by users who are determined to have roughly the same skill level. Alternatively, each of the seed values may be evaluated by a number of users with varying degrees of skill.

The progress data obtained at the block 704 may reflect the amount of progress that the monitored users have made playing the video game 112 with a particular seed value. For example, the progress data may indicate whether a particular user or set of users completed an objective with a particular seed value or failed to complete an objective with the particular seed value.

At block 706, for each seed evaluated, the seed evaluation system 136 normalizes the progress data based on skill data associated with each user from each of the sets of users. In other words, in some cases, the progress data obtained for each of the seed values may be normalized so that the different skill levels of different users do not impact the evaluation of the seeds. Alternatively, or in addition, progress data obtained with respect to a particular user for a seed may be weighted based on the user's skill level as determined by, for example, the user clustering system 134. In some cases, the user's skill level may be determined based on points earned playing the video game 112 or some other metric for monitoring the skills of a particular user.

In some embodiments, the block 706 may be optional or omitted. For example, in cases where the set of users selected to evaluate each seed are associated with a particular user cluster or are each determined to have less than a threshold difference of skill level, it may be unnecessary to normalize the progress data and the block 706 may be omitted.

At block 708, the seed evaluation system 136 determines a difficulty associated with each seed based on the associated normalize progress data. The difficulty may be determined based on the number or percentage of users who are successful or unsuccessful in completing an objective or a portion of the video game 112 when a particular seed value associated with the objective or the portion of the video game 112 is used. Advantageously, in certain embodiments, by evaluating the difficulty of seed values, it is possible to group or cluster sets of seed values for a particular difficulty levels. Thus, in some cases, if it is determined that a particular user prefers to play easier video games, seed values that are associated with a lower difficulty level may be used to generate portions of the video game 112. Further, the process 700 enables developers to confirm the level of difficulty associated with a particular seed value and to make adjustments to the classification of a particular seed value. For example, a particular seed value may be used with players who select an easy difficulty level. However, after evaluating a number of play sessions for a number of users with the particular seed value using the process 700, it may be determined that the seed value causes a portion of the video game 112 to be significantly more challenging than when the portion of the video game 112 is associated with other seed values. In such a case, the particular seed value may be reclassified for use with players who prefer or select a harder difficulty level and may be removed from availability for use with players who prefer or select an easy difficulty level.

Overview of Computing System

Figure 8:
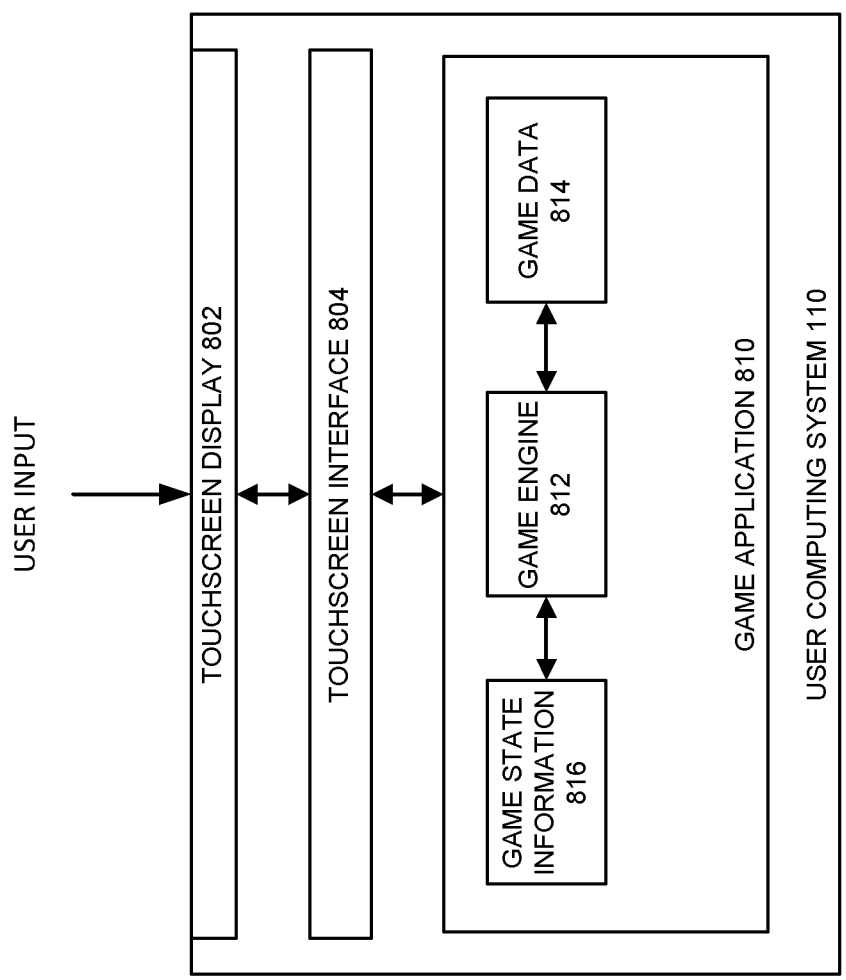
FIG. 8 illustrates an embodiment of a user computing system.

FIG. 8 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 8, the user computing system 110 is a touch-capable computing device capable of receiving input from a user via a touchscreen display 802. However, the user computing system 110 is not limited as such and may include non-touch capable embodiments, which do not include a touchscreen display 802.

The user computing system 110 includes a touchscreen display 802 and a touchscreen interface 804, and is configured to execute a game application 810. This game application may be the video game 112 or an application that executes in conjunction with or in support of the video game 112, such as a video game execution environment. Although described as a game application 810, in some embodiments the application 810 may be another type of application that may have a variable execution state based at least in part on the preferences or capabilities of a user, such as educational software. While user computing system 110 includes the touchscreen display 802, it is recognized that a variety of input devices may be used in addition to or in place of the touchscreen display 802.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 810. For example, the user computing system 110 may be a video game console. The game applications 810 executed by the user computing system 110 may be created using a particular application programming interface (API) or compiled into a particular instruction set that may be specific to the user computing system 110. In some embodiments, the user computing system 110 may be a general purpose computing device capable of executing game applications 810 and non-game applications. For example, the user computing system 110 may be a laptop with an integrated touchscreen display or desktop computer with an external touchscreen display. Components of an example embodiment of a user computing system 110 are described in more detail with respect to FIG. 9.

The touchscreen display 802 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 802. The touchscreen interface 804 can be configured to translate the touch input into data and output the data such that it can be interpreted by components of the user computing system 110, such as an operating system and the game application 810. The touchscreen interface 804 can translate characteristics of the tactile touch input touch into touch input data. Some example characteristics of a touch input can include, shape, size, pressure, location, direction, momentum, duration, and/or other characteristics. The touchscreen interface 804 can be configured to determine the type of touch input, such as, for example a tap (for example, touch and release at a single location) or a swipe (for example, movement through a plurality of locations on touchscreen in a single touch input). The touchscreen interface 804 can be configured to detect and output touch input data associated with multiple touch inputs occurring simultaneously or substantially in parallel. In some cases, the simultaneous touch inputs may include instances where a user maintains a first touch on the touchscreen display 802 while subsequently performing a second touch on the touchscreen display 802. The touchscreen interface 804 can be configured to detect movement of the touch inputs. The touch input data can be transmitted to components of the user computing system 110 for processing. For example, the touch input data can be transmitted directly to the game application 810 for processing.

In some embodiments, the touch input data can undergo processing and/or filtering by the touchscreen interface 804, an operating system, or other components prior to being output to the game application 810. As one example, raw touch input data can be captured from a touch input. The raw data can be filtered to remove background noise, pressure values associated with the input can be measured, and location coordinates associated with the touch input can be calculated. The type of touch input data provided to the game application 810 can be dependent upon the specific implementation of the touchscreen interface 804 and the particular API associated with the touchscreen interface 804. In some embodiments, the touch input data can include location coordinates of the touch input. The touch signal data can be output at a defined frequency. Processing the touch inputs can be computed many times per second and the touch input data can be output to the game application for further processing.

A game application 810 can be configured to be executed on the user computing system 110. The game application 810 may also be referred to as a video game, a game, game code and/or a game program. A game application should be understood to include software code that a user computing system 110 can use to provide a game for a user to play. A game application 810 might comprise software code that informs a user computing system 110 of processor instructions to execute, but might also include data used in the playing of the game, such as data relating to constants, images and other data structures. For example, in the illustrated embodiment, the game application includes a game engine 812, game data 814, and game state information 816.

The touchscreen interface 804 or another component of the user computing system 110, such as the operating system, can provide user input, such as touch inputs, to the game application 810. In some embodiments, the user computing system 110 may include alternative or additional user input devices, such as a mouse, a keyboard, a camera, a game controller, and the like. A user can interact with the game application 810 via the touchscreen interface 804 and/or one or more of the alternative or additional user input devices. The game engine 812 can be configured to execute aspects of the operation of the game application 810 within the user computing system 110. Execution of aspects of gameplay within a game application can be based, at least in part, on the user input received, the game data 814, and game state information 816. The game data 814 can include game rules, prerecorded motion capture poses/paths, environmental settings, constraints, animation reference curves, skeleton models, and/or other game application information. Further, the game data 814 may include information that is used to set or adjust the difficulty of the game application 810.

The game engine 812 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 810, the game application 810 can store game state information 816, which can include character states, environment states, scene object storage, and/or other information associated with a state of execution of the game application 810. For example, the game state information 816 can identify the state of the game application at a specific point in time, such as a character position, character action, game level attributes, and other information contributing to a state of the game application.

The game engine 812 can receive the user inputs and determine in-game events, such as actions, collisions, runs, throws, attacks and other events appropriate for the game application 810. During operation, the game engine 812 can read in game data 814 and game state information 816 in order to determine the appropriate in-game events. In one example, after the game engine 812 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 9:
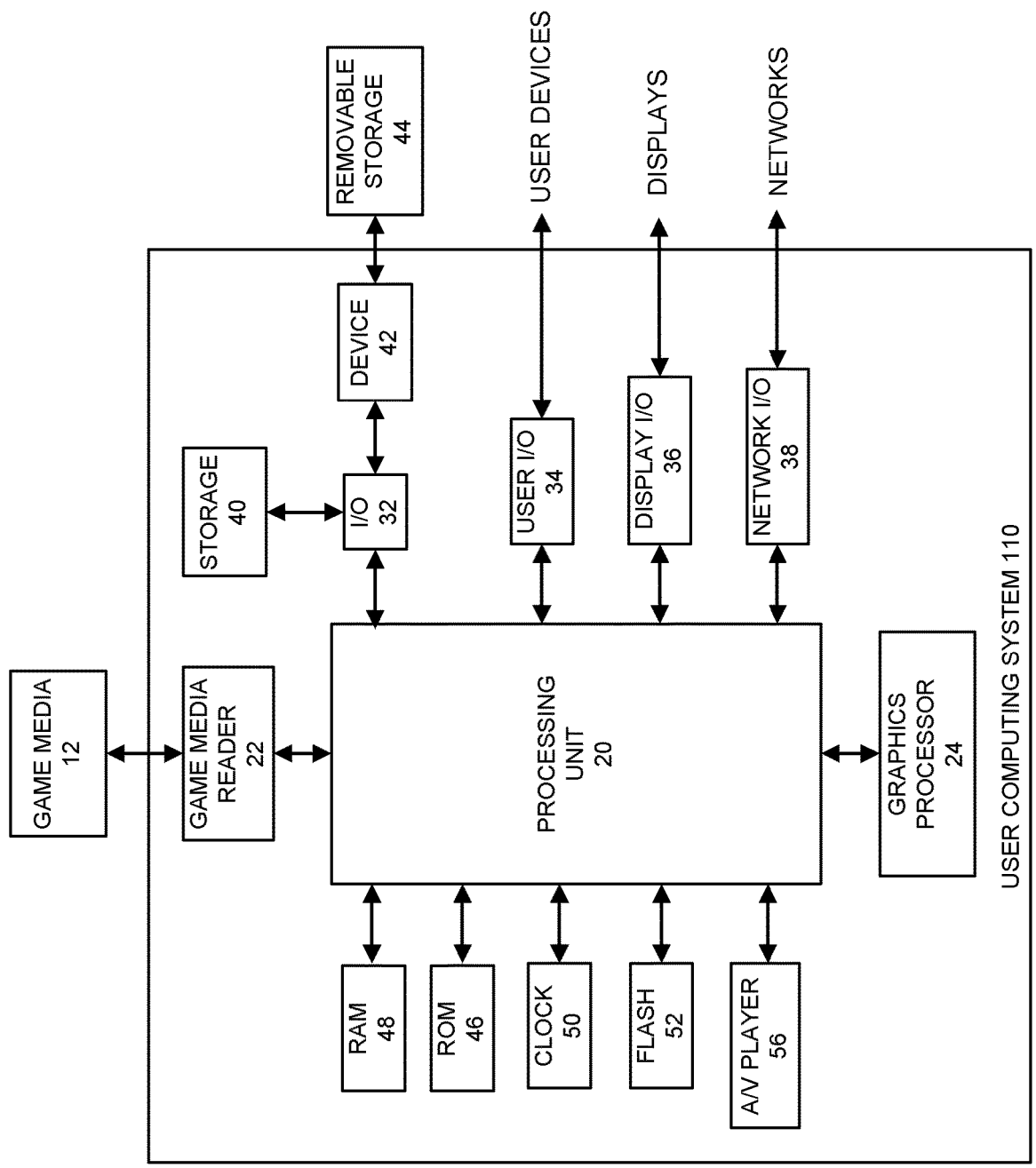
FIG. 9 illustrates an embodiment of a hardware configuration for the user computing system of FIG. 8.

FIG. 9 illustrates an embodiment of a hardware configuration for the user computing system 110 of FIG. 8. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 9) as described with respect to FIG. 8, the user computing system 110 may optionally include a touchscreen display 802 and a touchscreen interface 804.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 800. Processing unit 20 can communicate through I/O 32 to store data, such as game state data and any shared data files. In addition to storage 40 and removable storage media 44, computing device 800 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the computing device 800.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

ADDITIONAL EMBODIMENTS

In certain embodiments, a computer-implemented method is disclosed that may be implemented by an interactive computing system configured with specific computer-executable instructions to at least determine a user identifier of a first user who is playing a video game on a user computing device. The method may further include identifying a user cluster associated with the first user from a plurality of user clusters based at least in part on the user identifier of the first user. Each user cluster from the plurality of user clusters may correspond to different state preferences for the video game. Moreover, based at least in part on state preferences associated with the identified user cluster, the method may include determining a configuration value for a knob associated with the video game. The knob may include a variable that when adjusted causes a modification to a state of the video game. In addition, the method may include accessing recent user interaction data associated with the first user playing the video game over a first time period and determining an adjustment to the configuration value based at least in part on the recent user interaction data to obtain a modified configuration value. Further, the method may include generating a configuration data package that comprises the modified configuration value for transmission to the user computing device for modifying execution of the video game by adjusting the knob based at least in part on the modified configuration value.

In some implementations, the modification to the state of the video game adjusts a difficulty of the video game. Further, the first time period may be less than a first threshold time period. In addition, the method may include generating the plurality of user clusters by at least identifying a plurality of users who play a second video game and obtaining user interaction data for each user of the plurality of users by at least monitoring the user's interaction with the second video game over a second time period. In addition, the method may include determining a level of engagement for each user of the plurality of users based at least in part on the user interaction data and determining the plurality of user clusters based at least in part on the user interaction data for each user of the plurality of users and the level of engagement for each user of the plurality of users. In some cases, the second video game and the video game are the same. Further, the second time period may be greater than a second threshold time period.

In some embodiments, the method includes associating the first user with the user cluster by at least obtaining historical user interaction data for the first user by at least monitoring the first user's interaction with a third video game over a third time period, accessing cluster definitions for the plurality of user clusters, and selecting the user cluster from the plurality of user clusters based at least in part on the historical user interaction data and the cluster definitions for the plurality of user clusters. In some cases, the third video game and the video game are the same. Further, the third time period may be longer than the first time period.

In certain embodiments of the present disclosure, a system comprising an electronic data store configured to store user interaction data with respect to a video game and a hardware processor in communication with the electronic data store is disclosed. The hardware processor may be configured to execute specific computer-executable instructions to at least identify a user cluster associated with a first user from a plurality of user clusters. At least some of the user clusters from the plurality of user clusters may correspond to different state preferences for video games played by users associated with the user cluster. The system, based at least in part on state preferences associated with the identified user cluster, may further determine a configuration value for a state variable associated with a video game played by the first user. In addition, the system may access, from the electronic data store, recent user interaction data associated with the first user accessing the video game over a first time period and determine an adjustment to the configuration value based at least in part on the recent user interaction data to obtain a modified configuration value. Moreover, the system may generate a configuration data package that comprises the modified configuration value for transmission to a user computing device for modifying execution of the video game by adjusting the state variable based at least in part on the modified configuration value.

In certain implementations, the modified execution of the video game is undetectable by the first user. Further, the first time period may include a dynamic time window that adjusts with the passage of time. In some embodiments, at least the accessing recent user interaction data, the determining an adjustment to the configuration value, and the modifying the execution of the video game is repeated in response to a trigger event occurring during a play session of the video game by the first user.

In some implementations, the hardware processor is further configured to generate the plurality of user clusters by executing specific computer-executable instructions to at least identify a plurality of users who play the video game and access user interaction data associated with accessing the video game from the electronic data store for each user of the plurality of users. The user interaction data may be recorded over a second time period. Further, the system may determine a level of engagement for each user of the plurality of users based at least in part on the user interaction data and determine the plurality of user clusters based at least in part on the user interaction data for each user of the plurality of users and the level of engagement for each user of the plurality of users.

Further, the system may associate the first user with the user cluster by executing specific computer-executable instructions to at least obtain historical user interaction data for the first user by at least monitoring the first user's access of the video game over a third time period. The system may further access cluster definitions for the plurality of user clusters and select the user cluster from the plurality of user clusters based at least in part on the historical user interaction data and the cluster definitions for the plurality of clusters. In some cases, the third time period precedes the first time period and the third time period is longer than the first time period.

In certain embodiments of the present disclosure, a non-transitory computer-readable storage medium storing computer executable instructions that, when executed by one or more computing devices, configure the one or more computing devices to perform operations comprising identifying a user cluster associated with a first user from a plurality of user clusters. At least some of the user clusters from the plurality of user clusters may correspond to different state settings for applications accessed by users associated with the user cluster. Moreover, based at least in part on state settings associated with the identified user cluster, the operations may include determining a configuration value for a state variable associated with an application accessed by the first user and accessing recent user interaction data associated with the first user accessing the application over a first time period. In addition, the operations may include determining an adjustment to the configuration value based at least in part on the recent user interaction data to obtain a modified configuration value and generating a configuration data package that comprises the modified configuration value for transmission to a user computing device for modifying execution of the application by adjusting the state variable based at least in part on the modified configuration value.

In some implementations, the operations further comprise generating the plurality of user clusters by at least identifying a plurality of users who access the application and obtaining user interaction data for each user of the plurality of users by at least monitoring the user's interaction with the application over a second time period. In addition, the operations may include determining a level of engagement for each user of the plurality of users based at least in part on the user interaction data and determining the plurality of user clusters based at least in part on the user interaction data for each user of the plurality of users and the level of engagement for each user of the plurality of users.

In some cases, the operations may further include associating the first user with the user cluster by at least obtaining historical user interaction data for the first user by at least monitoring the first user's access of the application over a third time period and determining difficulty preferences for the first user based at least in part on the historical user interaction data. In addition, the operations may include accessing cluster definitions for the plurality of user clusters. Each cluster definition may identify difficulty preferences for users associated with the corresponding user cluster. Further, the operations may include selecting the user cluster from the plurality of user clusters by matching the difficulty preference for the first user with the difficulty preferences of the cluster definition corresponding to the user cluster. In addition, the third time period may begin at a point in time that precedes the start of the first time period and the third time period may be longer than the first time period.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
accessing user interaction data of a user, wherein the user interaction data is associated with interaction by the user with a video game;
accessing a plurality of cluster definitions associated with a plurality of clusters, wherein each cluster definition of the plurality of cluster definitions is associated with a different cluster of the plurality of clusters, and wherein each cluster of the plurality of clusters comprises an identity of one or more users who share one or more engagement characteristics associated with interaction with the video game;
selecting a target cluster from the plurality of clusters based at least in part on the user interaction data of the user and the plurality of cluster definitions;
identifying a configuration value for a state variable of the video game based at least in part on the target cluster; and
configuring the state variable using the configuration value, wherein configuring the state variable adjusts a difficulty of the video game.

2. The computer-implemented method of claim 1, wherein the state variable comprises a seed value that modifies execution of the video game.

3. The computer-implemented method of claim 1, further comprising monitoring the user's interaction with the video game over a time period to obtain the user interaction data.

4. The computer-implemented method of claim 1, wherein a change in execution of the video game associated with configuring the state variable is undetectable by the user.

5. The computer-implemented method of claim 1, wherein selecting the target cluster from the plurality of clusters comprises matching characteristics of the user interaction data with characteristics associated with each of the plurality of clusters.

6. The computer-implemented method of claim 1, further comprising storing an association between the user and the target cluster.

7. The computer-implemented method of claim 1, wherein the plurality of clusters are associated with the video game, and wherein a second plurality of clusters are associated with a second video game.

8. The computer-implemented method of claim 1, wherein each cluster from the plurality of clusters is associated with a different difficulty level for the video game, and wherein identifying the configuration value for the state variable comprises determining a difficulty level associated with the target cluster.

9. The computer-implemented method of claim 1, further comprising:
determining a user success value by predicting a user's success at playing the video game based at least in part on the target cluster and the user interaction data; and
selecting the configuration value based at least in part on the user success value.

10. The computer-implemented method of claim 1, further comprising:
obtaining second user interaction data of the user based on interaction with the video game that is more recent than the interaction with the video game associated with the user interaction data; and
modifying the configuration value for the state variable based at least in part on the second user interaction data.

11. The computer-implemented method of claim 1, wherein the one or more engagement characteristics may correspond to one or more of time played, success rate with respect to in-game objectives, or difficulty of video games.

12. The computer-implemented method of claim 1, further comprising presenting an engagement characteristic associated with the target cluster to the user.

13. The computer-implemented method of claim 12, further comprising receiving feedback from the user associated with the engagement characteristic and modifying selection of the target cluster to select a second target cluster based at least in part on the feedback from the user.

14. A system comprising:
an electronic data store configured to store cluster definitions that group user identities of users who play a video game, wherein each cluster definition is associated with a particular engagement characteristic associated with playing the video game; and
a hardware processor in communication with the electronic data store, the hardware processor configured to execute specific computer-executable instructions to at least:
access user interaction data of a user, wherein the user interaction data is associated with interaction by the user with the video game;
access from the electronic data store a plurality of cluster definitions associated with a plurality of clusters, wherein each cluster definition of the plurality of cluster definitions is associated with a different cluster of the plurality of clusters, and wherein each cluster of the plurality of clusters comprises an identity of one or more users who share one or more engagement characteristics associated with interaction with the video game;
select a target cluster from the plurality of clusters based at least in part on the user interaction data of the user and the plurality of cluster definitions;
identify a configuration value for a state variable of the video game based at least in part on the target cluster; and
configure the state variable using the configuration value, wherein configuring the state variable adjusts a difficulty of the video game.

15. The system of claim 14, wherein a change in execution of the video game associated with configuring the state variable is undetectable by the user.

16. The system of claim 14, wherein the hardware processor is further configured to select the target cluster from the plurality of clusters by at least matching characteristics of the user interaction data with characteristics associated with each of the plurality of clusters.

17. The system of claim 14, wherein each cluster from the plurality of clusters is associated with a different difficulty level for the video game, and wherein the hardware processor is further configured to identify the configuration value for the state variable by at least determining a difficulty level associated with the target cluster.

18. The system of claim 14, wherein the hardware processor is further configured to execute specific computer-executable instructions to at least:
determine a predicted success of the user at playing the video game based at least in part on the target cluster and the user interaction data; and select the configuration value based at least in part on the predicted success.

19. The system of claim 14, wherein the hardware processor is further configured to execute specific computer-executable instructions to at least:
   obtain second user interaction data of the user based on interaction with the video game that is more recent than the interaction with the video game associated with the user interaction data; and
   modify the configuration value for the state variable based at least in part on the second user interaction data.

20. The system of claim 14, wherein the hardware processor is further configured to execute specific computer-executable instructions to at least:
   present an engagement characteristic associated with the target cluster to the user;
   receive feedback from the user associated with the engagement characteristic; and
   modify selection of the target cluster to select a second target cluster based at least in part on the feedback from the user.

* * * * *